US010876040B2

(12) United States Patent
Barati Ghahfarokhi

(10) Patent No.: US 10,876,040 B2
(45) Date of Patent: *Dec. 29, 2020

(54) STABILITY IMPROVEMENT OF FOAMS FOR ENHANCED OIL RECOVERY APPLICATIONS USING POLYELECTROLYTES AND POLYELECTROLYTE COMPLEX NANOPARTICLES

(71) Applicant: THE UNIVERSITY OF KANSAS, Lawrence, KS (US)

(72) Inventor: Reza Barati Ghahfarokhi, Lawrence, KS (US)

(73) Assignee: THE UNIVERSITY OF KANSAS, Lawrence, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 16/270,144

(22) Filed: Feb. 7, 2019

(65) Prior Publication Data

US 2019/0169487 A1 Jun. 6, 2019

Related U.S. Application Data

(63) Continuation-in-part of application No. 15/226,525, filed on Aug. 2, 2016, now Pat. No. 10,214,680.

(60) Provisional application No. 62/203,772, filed on Aug. 11, 2015.

(51) Int. Cl.
| | |
|---|---|
| C09K 8/594 | (2006.01) |
| C09K 8/584 | (2006.01) |
| E21B 43/16 | (2006.01) |
| E21B 43/24 | (2006.01) |
| C09K 8/588 | (2006.01) |

(52) U.S. Cl.
CPC .............. *C09K 8/594* (2013.01); *C09K 8/584* (2013.01); *C09K 8/588* (2013.01); *E21B 43/164* (2013.01); *E21B 43/24* (2013.01); *C09K 2208/10* (2013.01)

(58) Field of Classification Search
CPC ........ C09K 8/594; C09K 8/584; C09K 8/588; C09K 2208/10; E21B 43/164; E21B 43/24

See application file for complete search history.

(56) References Cited

U.S. PATENT DOCUMENTS

| | | | |
|---|---|---|---|
| 2,866,507 A | 12/1958 | Bond et al. | |
| 8,183,184 B2 | 5/2012 | Berkland | |
| 8,372,786 B2 | 2/2013 | Berkland | |
| 9,546,316 B2 | 1/2017 | Al-Otaibi | |
| 2004/0204510 A1 | 10/2004 | Clear | |
| 2008/0058229 A1 | 3/2008 | Berkland | |
| 2010/0056399 A1* | 3/2010 | Berkland | ............... C09K 8/516 507/201 |

(Continued)

OTHER PUBLICATIONS

D. Green and P. Willhite, Enhanced Oil Recovery, SPE, 1998.

(Continued)

*Primary Examiner* — Crystal J Miller
(74) *Attorney, Agent, or Firm* — Lathrop GPM, LLP

(57) ABSTRACT

Polyelectrolyte nanoparticles are generated to stabilize foam for use in enhanced oil recovery. Stability is further enhanced by optimizing pH and a ratio of polycationic and polyanioinic materials, resulting in stronger and longer lasting foams in the presence of crude oil. Use of these nanoparticles results in negligible damage to formation permeability.

20 Claims, 11 Drawing Sheets

(56) References Cited

U.S. PATENT DOCUMENTS

| | | | | |
|---|---|---|---|---|
| 2010/0096139 A1* | 4/2010 | Holcomb | ............... | C09K 8/536 |
| | | | | 166/308.1 |
| 2013/0123149 A1 | 5/2013 | Berkland | | |
| 2014/0131046 A1 | 5/2014 | Al-Otaibi | | |
| 2014/0209305 A1 | 7/2014 | Lin | | |
| 2016/0024360 A1* | 1/2016 | Bestaoui-Spurr | ........ | C09K 3/22 |
| | | | | 427/221 |
| 2016/0115371 A1 | 4/2016 | Johnson | | |
| 2017/0088768 A1 | 3/2017 | Al-Otaibi | | |
| 2017/0198203 A1 | 7/2017 | Allen | | |

OTHER PUBLICATIONS

J. Christensen, E. Stenby and A. Skauge, "Review of WAG Field Experience," SPE, pp. 97-106, 2001.

D. X. Micha, B. Wei, Y. Sung, J. Eastoe, K. Trickett and A. Mohamed, "CO2 soluble surfactants for Improved Mobility Control," in SPE Improved Oil recovery symposium 2010, Oklahoma, 2010.

R. M. Enick and D. K. Olsen, "Mobility and Conformance Control for Carbon Dioxide Enhanced Oil Recovery (CO2-EOR) via Thickeners, Foams, and Gels—A Detailed Literature Review of 40 Years of Research," U.S. Department of Energy, 2012.

J. Yu, C. An, D. Mo, N. Liu and R. Lee, "Foam Mobility Control for Nanoparticle-Stabilized CO2 Foam," in SPE Improved Oil recovery symposium , Oklahoma, 2012.

J. Yu, N. Liu and R. Lee, "Generation of Nanoparticle-Stabilized Supercritical CO2 Foams," in Carbon Management Technology Conference, Orlando, 2012.

P. Nguyen, H. Fadaei and D. Sinton, "Nanoparticle Stabilized CO2 in water foam for Mobility Control in Enhanced Oil Recovery via Microfluidic Method," in SPE Heavy oil conference—Canada, Totonto, 2014.

D. E. Alejandro, F. M. Caldelas, K. P. Johnston, S. L. Bryant and C. Huh, "Nanoparticle-Stabilized Supercritical CO2 Foams for Potential Mobility Control Applications," in SPE Improved Oil Recovery Symposium, Tulsa, 2010.

J. Koetz and S. Kosmella, Polyelectrolytes and Nanoparticles, Springer Laboratory Manuals in Polymer Science, 2006.

J. Koetz, S. Kosmella and T. Beitz, "Self assembled polyelectrolyte systems," Elseiver, Progress in Polymer Science, pp. 1199-1232, 2001.

N. Kristen and R. v. Klitzing, "Effect of polyelectrolyte/surfactant combination on the stability of foam films," 2010.

D. Taylor, R. Thomas and J. Penfold, "Polymer/surfactant interactions at the air/water interface," Advances in Colloid and Interface Science 132 (2007) 69-110, pp. 70-110, 2007.

K. He, Z. Yue, C. Fan and L. Xu, "Minimizing Surfactant Adsorption Using Polyelectrolyte Based Sacrificial Agent: a Way to Optimize Surfactant Performance in Unconventional Formations," in SPE International Symposium on Oilfield Chemistry, Woodlands, 2015.

R. Barati, S. Johnson, S. Mc Cool, D. Green and J. Liang, "Polyelectrolyte complex nanoparticles for protection and delayed release of enzymes in alkaline pH and at elevated temperature during hydraulic fracturing of oil wells," Journal of Applied Polymer Science, pp. 587-592, 2012.

R. Barati, S. Johnson, S. McCool, D. Green, G. Willhite and J. Liang, "Fracturing fluid cleanup by controlled release of enzymes from polyelectrolyte complex nanoparticles," Applied Polymer Science, vol. 121, No. 3, pp. 1292-1298, Aug. 5, 2011.

S. Johnson, J. Trejo, M. W. P. G. Veisi, J.-T. Liang and C. Berkland, "Effects of divalent cations, seawater, and formation brine on positively charged polyethylenimine/dextran sulfate/chromium(III) polyelectrolyte complexes and partially hydrolyzed polyacrylamide/chromium(III) gelation," Journal of Applied Polymer Science, vol. 115, No. 2, pp. 1008-1014, 2010.

D. S. Schechter and R. B. Grigg, "Improved efficiency of miscible CO2 floods and Enhanced prospects for CO2 flooding heterogenous reservoirs," U.S. Department of Energy, Socorro, 1998.

R. Petkova, S. Tcholakova and N. Denkov, "Foaming and foam stability for mixed polymer-surfactant solutions: effects of surfactant type and polymer charge," Langmuir, ACS Publications, pp. 4996-5009, 2012.

T. J. Waree, R. C. Sims and R. Middaugh, "Insulin Containing Polyethylenimine-Dextran Sulfate Nanoparticles." International Journal of Pharmaceutics, pp. 139-151, 2003.

C. B. Chempakathinal, B. Alshatti, L. Swartz, A. Gupta and R. Barati, "Dual Application of Polyelectrolyte Complex Nanoparticles as Enzyme Breaker Carriers and Fluid Loss Additives for Fracturing Fluids," in SPE/CSUR Unconventional Resources Conference—Canada, Sep. 30-Oct. 2, Calgary, 2014.

Ouyang, "New Correlations for Predicting the Density and Viscosity of Supercritical Carbon Dioxide Under Conditions Expected in Carbon Capture and Sequestration Operations," The Open Petroleum Engineering Journal (2011).

Ghahfarokhi, R. B., Pennell, S., Matson, M., & Linroth, M. (Apr. 11, 2016). Overview of C02 Injection and WAG Sensitivity in SACROC. Society of Petroleum Engineers. doi: 10.2118/179569-MS.

S.J. Johnson, R. Barati, S. McCool, D. W. Green, G.P. Willhite and J.-T. Liang, "Polyelectrolyte Complex Nanoparticles to Entrip Enzymes for Hydraulic Fracturing Fluid Cleanup," in Abstracts of Papers of the American Chemical Society, 2011.

\* cited by examiner

STABILITY IMPROVEMENT OF FOAMS FOR ENHANCED OIL RECOVERY APPLICATIONS USING POLYELECTROLYTES AND POLYELECTROLYTE COMPLEX NANOPARTICLES

RELATED APPLICATIONS

This application is a continuation-in-part of U.S. patent application Ser. No. 15/226,525, filed Aug. 2, 2016, which is pending and claims the benefit of priority to U.S. Provisional Patent Application No. 62/203,772 filed Aug. 11, 2015. The disclosures of both applications are hereby incorporated by reference to the same extent as though fully replicated herein.

BACKGROUND[1]

Injection of carbon dioxide ($CO_2$) to produce the residual oil from oil-bearing formations has been practiced for many years. $CO_2$, if injected under miscible conditions, may significantly reduce oil viscosity, which enables a greater percentage recovery of oil in place. $CO_2$ flooding is one technique for enhanced or tertiary recovery of oil. These designations apply because the injection of $CO_2$ classically follows primary and secondary (water flood) stages of production from an oil reservoir. Even so, the advantageous characteristics of low viscosity and density result in problems of their own due to the low mobility ratio of $CO_2$, which results from the relatively low density and low viscosity of $CO_2$. These characteristics encourage flow-segregation into areas of reservoir rock such that other areas of reservoir rock are not swept. By way of example, the segregation is associated with such problems as viscous fingering and gravity override, resulting in poor vertical sweep and poor aerial sweep efficiencies. The problem of viscous fingering is associated with an unnecessarily early breakthrough of the $CO_2$ front. This happens because injected $CO_2$ has a problematic tendency to segregate into high permeability streaks that maybe found within reservoir rocks, such as rock matrix structure in zones having a high inherent permeability as compared to other zones of rock, or zones of fractured rock. Gravity segregation is another problem caused by low density of $CO_2$ which can result in gravity override such that the flood does not sweep lower portions of the rock (Green and Willhite, 1998). Thus, the reduced sweep efficiency impairs ultimate recovery of oil in place because the $CO_2$ simply bypasses portions of the reservoir rock. In other instances, gravity causes the $CO_2$ segregate into the upper portion of reservoir rock, such that lower portions are not swept.

[1] Citation to references in this discussion are to a References section found at the end of this Specification.

$CO_2$ has many advantages over other gases such as nitrogen, although nitrogen may be used in some scenarios. Particular advantages of $CO_2$ include an ability to achieve a supercritical state at most reservoir conditions of pressure and temperature, together with crude oil miscibility where $CO_2$ dissolves into crude oil with consequent beneficial reduction of oil viscosity. $CO_2$ injection, otherwise known as $CO_2$ flooding, may be alternatively designed to perform as a miscible flood or an immiscible flood.

Different methods have been proposed to combat the aforementioned problems. One such solution is the injection of slugs of water alternating with $CO_2$, i.e. water alternating gas or WAG. This technique increases the water saturation of the pores and reduces the $CO_2$ saturation, but does not improve the mobility ratio problem of the $CO_2$ portion of the flood. The WAG technique problematically results in reduced injectivity of both $CO_2$ and water (Christensen, Stenby and Skauge, 2012; Ghahfarokhi, Pennell, Matson, and Linroth, M. 2016).

$CO_2$ foam has been proposed as another a solution to these problems (Bond & Hollbrook, 1958). These foams may be surfactant-based, i.e., as a colloidal dispersion of gas in a matrix of surfactant and water. As used herein, a "foam" is a gas or supercritical fluid dispersed in a liquid. By way of example, it is possible to construct a $CO_2$ or $N_2$ foam as $CO_2$ or $N_2$ bubbles in the form of gas or supercritical $CO_2$ or $N_2$ separated by a liquid film having perhaps from 60% to 97% $CO_2$ or $N_2$ content by volume of the $CO_2$ or $N_2$ bubbles. Addition of certain non-ionic surfactants aid in the generation of foam, especially if the surfactants are at least partially $CO_2$ (or $N_2$) soluble (Micha, Wei, Sung, Eastoe, Trickett and Mohamed, 2010). The use of foam may beneficially reduce mobility of the $CO_2$ (or $N_2$) by up to 100 times that of injected $CO_2$ (or $N_2$) alone. The reduction of $CO_2$ (or $N_2$) mobility occurs because the foam is less permeable and more viscous than $CO_2$ (or $N_2$) alone (generally, Syandansk & Zeron, 2011). Also, $CO_2$ foams advantageously have shear thinning characteristics and may be made from environmentally friendly materials.

Nonetheless, problems exist such that these foams do not enjoy widespread use. Surfactant generated $CO_2$ foams are known to be thermodynamically unstable. These foams also incur adsorption loss of surfactant to the formation rock (Enick & Olsen, 2012). Thickeners used as viscosifying agents for the $CO_2$ have been addressed to improve the mobility control, as have silica nanoparticles. By way of example, certain polymer additives may increase $CO_2$ viscosity up to ten times. Even so, use of these thickeners implicates use of specialized equipment, such as high pressure mixing tanks. The thickeners are also associated with such problems as permeability reduction due to polymer retention by the reservoir rock, especially when these polymers encounter water.

Other researchers have reported investigating nanoparticle-stabilized $CO_2$ foams that may be formed without the use of surfactants (Yu, An, Mo, Liu and Lee, 2 "Foam Mobility Control for Nanoparticle-Stabilized $CO_2$ Foam," in SPE Improved Oil recovery symposium, Oklahoma, 2012; Yu, Liu, and Lee, "Generation of Nanoparticle-Stabilized Supercritical $CO_2$ Foams," in Carbon Management Technology Conference, Orlando, 2012; Nguyen, Fadaei and Sinton, 2014). Yu et al. reported that the adhesion energy of the nanoparticle system at the fluid interface is much higher than the surfactant and hence are able to generate longer lasting foams. Various other aspects of the nanoparticle stabilized foams, such as the effect of salinity on the particle size of the nanoparticles, has been established by Alejandro, Caldelas, Johnston, Bryant and Huh, 2010.

Polyelectrolytes materials are capable of forming nanoparticles, especially by virtue of electrostatic interactions between cationic and anionic polyelectrolytes (Koetz and Kosmella, 2006; Koetz, Kosmella and Beitz, 2001; Kristen and Klitzing, 2010; Taylor, Thomas and Penfold, (2007). Polyelectrolytes are a class of polymers known to the art. Formed of repeating electrolyte units that dissociate in an aqueous solution, the units become charged when mixed with water. Acid or base materials may be added to adjust pH. The repeating units may be either linear or branched. Addition of polyelectrolytes to surfactant solutions may reduce the adsorption of surfactants in unconventional reservoirs (He, Yue, Fan and Xu, 2015).

SUMMARY

The presently disclosed instrumentalities mitigate the aforementioned problems and advanced the art. In particular, when formed within the bounds of certain constituent ratios, surfactant-based foams are significantly stabilized by the addition of polyelectrolyte-based nanoparticles. This type of foam system substantially increases the percentage recovery of oil in place among a variety of reservoir rock specimens.

According to one embodiment, a foam includes a gas or supercritical phase and a liquid dispersion phase. This may be any type of foam, provided that the foam is improved by the addition of polyelectrolyte material. In particular, the polyelectrolyte material is present, at least in part, at the lamellae or phase boundaries of the foam. The polyelectrolyte material is primarily formed of nanoparticles including cationic polyelectrolytes and anionic polyelectrolytes that are electrostatically attracted to one another. Generally, the nanoparticles may be any particle having an average particle diameter under one micron. The nanoparticles are preferably sized to dimensions that are suitable for flow through the rock pores of conventional oil reservoirs. Thus, the nanoparticle materials may be selected for size based upon the pore dimensions of reservoir rock.

Alternatively, it is not strictly necessary to mix polycationic and poly anionic materials to form nanoparticles which, for example, may be formed using one of a polycationic or polyanionic material alone with surfactant.

Although the foam may be any type of foam, it is particularly preferred for use in foam flooding applications that the foam has a quality ranging from 80% to 90%. The foam may alternatively be from 60% to 95% quality Or from 60% to 90% quality for other applications, such as foam that is mixed with proppant for use in hydraulic fracturing applications. The foam quality is determined as a percentage of the total foam volume that is occupied by gas or supercritical fluid, such as supercritical $CO_2$, at any given combination of temperature and pressure. As is well known in the art according to the various equations of physical chemistry, such as Boyle's Law and Charles's Law, pressure and temperature have substantial effects upon gas volume. Equation (1) below shows one such equation in common use for predicting the pressure-volume effect upon gas.

$$PV = ZnRT \quad (1)$$

where P is absolute pressure, V is volume, Z is a deviation factor (also sometimes called a compressibility factor) that accounts for behavioral differences between real gas and ideal gas volume and is inherent to a particular gas as is known in the art, n is the number of moles of gas, R is a gas constant, and T is absolute temperature. Thus, for example, with some deviation due to the Z factor, the volume of foam may be reduced to about half in consequence of doubling one of the absolute pressure or absolute temperature.

Equation (1) is not necessarily predictive of supercritical fluids. Other correlations have been developed to predict the PVT performance of supercritical fluids, which have characteristics of both liquids and gasses. By way of example, Ouyang (2011) reports such correlations for us with supercritical $CO_2$. Correlations such as these may be utilized to predict the effect upon foam quality by design when taking foam from one set of pressure and temperature conditions to another set of pressure and temperature conditions.

In one aspect, a foam may be generated proximal to a wellhead at conditions of temperature and/or pressure less than those found at the bottom of the well. This may be done, for example, by use of inline mixing. Thus, it is possible to provide foam of requisite quality at bottom hole conditions by pumping measured amounts of gas and liquid that are projected to form foam of requisite quality at the bottom hole conditions that are expected to exist during a foam flooding operation. By way of example, it is possible by design to provide a foam of 80% to 90% quality at the boundary of the oil reservoir (i.e., at bottom hole conditions) by use of known correlations for predicting the pressure-volume-temperature behavior of the foam constituents. In most cases, but not all cases, the compressibility will be dominated by the gas or supercritical fluid, as compared to the liquid phase. It will be appreciated that it is routine in the art to monitor bottom hole temperature and pressure.

In one aspect, the foam quality design parameters discussed above may accommodate any conditions of $CO_2$ supercritical pressure and temperature encountered in the field. This may be, for example, a condition 1300 psia and 40° C., or any other condition of supercritical temperature and pressure.

In one aspect, the liquid phase is a liquid dispersion phase because it contains particles dispersed in a liquid carrier. These particles include at least the aforementioned nanoparticles that are formed of polyelectrolyte material. Surfactant may also be included, and the liquid carrier is preferably water.

In one aspect, the polyelectrolyte material and the surfactant may be suitably combined in a ratio of surfactant material to polyelectrolyte material ranging from 3:1 to 9:1.

In one aspect, the polyelectrolyte material is present in the liquid phase in an amount ranging from 0.05% to 1% of the liquid phase by weight.

In one aspect, and acid or base may be added to the foam for the purpose of adjusting the pH to value ranging from 5 to 9. This will often be done by the use of an acid, such as HCl or $H_2SO_4$. Maintenance of proper pH may be, according to some embodiments, important factor in achieving foam stability and improving sweep efficiency of the foam as the foam travels through reservoir rock.

In one aspect, the surfactant may be non-ionic or anionic. It is possible to prepare a liquid phase including, for example, water, surfactant, polyelectrolyte material, and/or acid, and to combine this with a $CO_2$ gas phase utilizing a process known as in-line injection. Thus, the two phases may be combined in a tube with consequent foam generation in relative amounts providing the desired foam quality.

According to an embodiment, the foam includes a non-liquid fluid phase comprising $N_2$ in a supercritical phase; and a liquid dispersion phase comprising a dispersion of polyelectrolyte material and surfactant in water. The polyelectrolyte material and the surfactant are combined in a ratio of surfactant to polyelectrolyte material ranging from 3:1 to 9:1, and the polyelectrolyte material is present in an amount ranging from about 0.01% to 5% of the liquid phase by weight. The polyelectrolyte material forms nanoparticles by electrostatic interaction of a cationic and an anionic polyelectrolyte, the nanoparticles being located at lamellae of the liquid dispersion phase in an effective amount to stabilize the foam.

In one aspect, the aforementioned foam may be utilized in oilfield applications. For example, while field applications include at least foam flooding for purposes of enhanced oil recovery, as well as the use of foam in well stimulation and/or hydraulic fracturing. In the case of foam flooding, the foam is injected into an injection wellbore and travels down towards the oil reservoir. The foam transitions from the wellbore into the oil reservoir, traveling a distance through the reservoir towards a production well according to the established principles of foam flooding for purposes of enhanced oil recovery. Because the aforementioned foam is improved as compared to foams of the prior art, the foam has increased stability as it travels this distance through the oil reservoir, resulting in improved sweep efficiency for enhanced recovery of oil in place.

Use of the foam is not limited to foam flooding operations. In certain portions of the country, petroleum reservoirs may be found that are under-pressure with respect to normal hydrostatic head. In these reservoirs, the conduct of hydraulic fracturing for purposes of stimulating hydrocarbon production may lead to a dangerous or undesirable condition. If the well is full of liquid this may produce fractures extending well beyond the boundaries of the intended producing formation with consequent leakage, for example, of saltwater from adjacent formations resulting in reduced hydrocarbon production due to saltwater intrusion. Also, even if this problem does not transpire, the frac fluid may drain into the formation, which potentially creates a dangerous pressure imbalance at the wellhead due to entry of hydrocarbon gas into the wellbore. These problems may be avoided by mixing the foam with proppant to create a frac fluid and using this frac fluid in the hydraulic fracturing operation. Hydraulic fracturing operations are well known in the art and may be designed, for example, utilizing commercially available software such as STIMPLAN™ from NSI Technologies of Tulsa, Okla. and FracMan® from FracMan Technology Group of Redmond, Wash.

DETAILED DESCRIPTION

The presently disclosed instrumentalities teach by way of example, and not by limitation. Therefore, what is disclosed should not be used in a manner that unduly limits the scope of protection afforded to what is claimed.

Hardware

Figure 1:
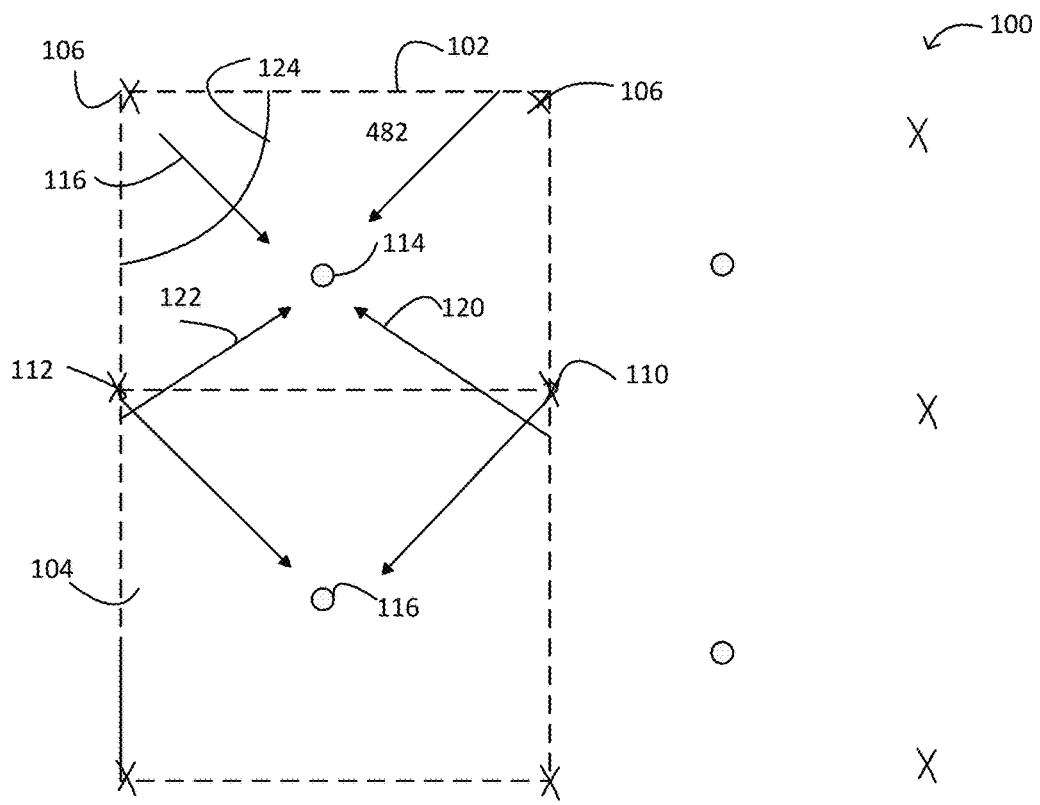
FIG. 1 is a schematic diagram of an oil field that has been provided with injection wells and producing wells in a conventional five-spot pattern.

FIG. 1 shows an oilfield 100 through drilling operations to provide a combination of injection wells designated by "X" and a producing well designated by "O." As shown in FIG. 1, which is presented as an aerial view looking down from above, the wells are provided in a classic five-spot pattern, such as adjacent patterns 102, 104. In this type of arrangement, injection wells at the corners of each pattern, such as corner wells 106, 108, 110, 112 of pattern 102, feed a production well 114 located at the center of the pattern. The injection wells 110, 112, also serve as injection wells feeding production well 116 of pattern 104. All of these wells penetrate deep into the earth for purposes of injecting and producing oil from an oil reservoir (not shown) to which all wells have common access. Thus, injected volumes of foam from injection wells 106, 108, 110, 112, respectively proceed towards production well 114 along distances indicated as average flow pathways 116, 118, 120, 122 for enhanced recovery of oil from production well 114. It will be appreciated that the flow of foam from the injection wells does not flow along these straight lines, at least not all of it, but rather proceeds outwardly from each of the injection wells and more or less of a radial pattern to present a foam front indicated by way of example as front 124 to provide a volumetric sweep of the underlying reservoir. Recovery of oil from this reservoir is consequently enhanced as compared to the instrumentalities of the prior art, and this is due to use of the aforementioned foam in the foam flooding operation as shown. Although FIG. 1 shows a five-spot pattern, it will be appreciated that this is only one type of injection pattern known to the art, that the five-spot pattern is not critical to what is claimed, and that any other type of injection pattern may be utilized for purposes of this disclosure.

Figure 2:
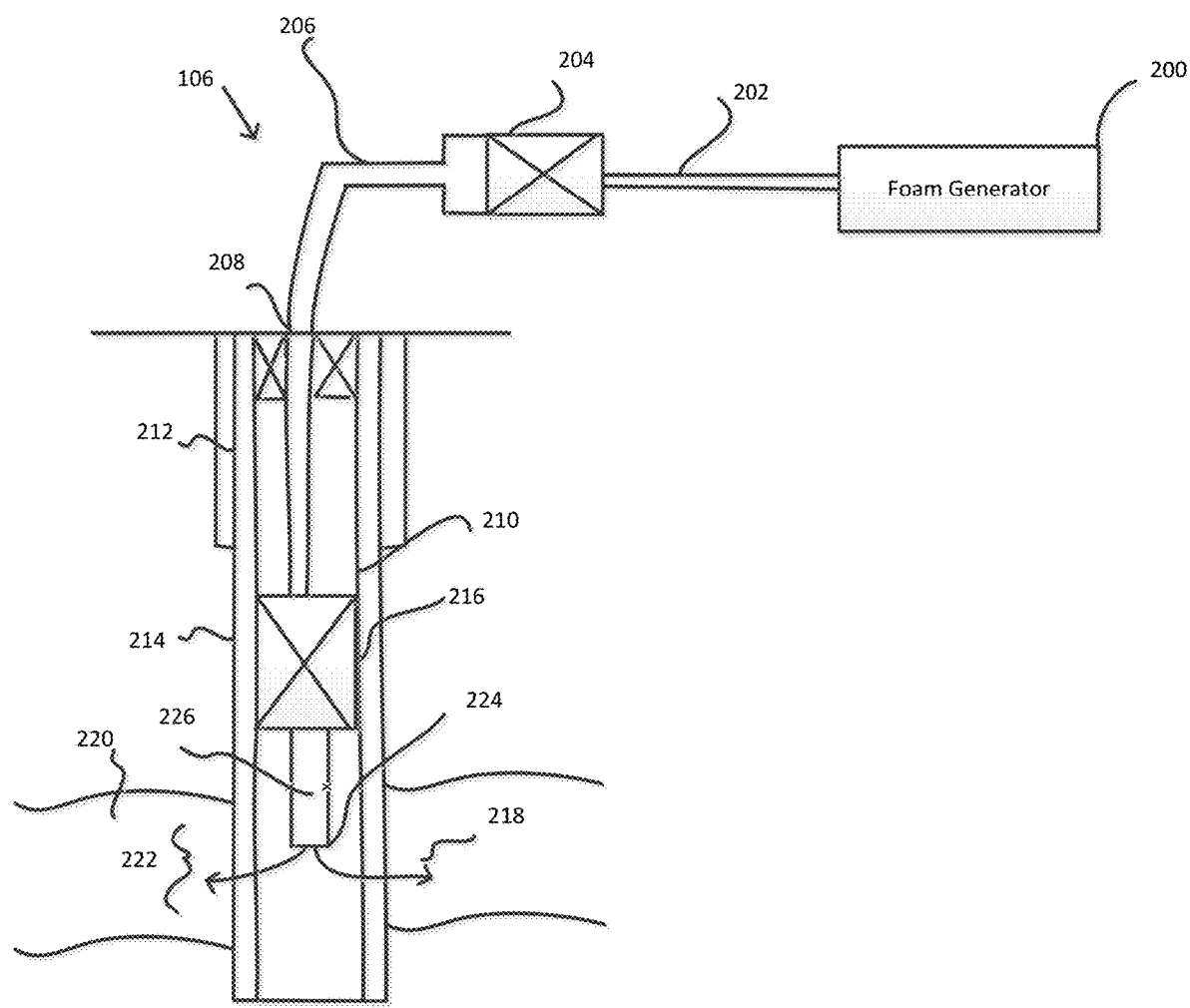
FIG. 2 is a wellbore schematic of equipment that may be used in an injection well.

FIG. 2 shows an arrangement that may be used for purposes of foam injection into one of the injection wells, such as injection well 106. The purpose of this arrangement is to provide a $CO_2$-based foam that achieves a supercritical state at bottom hole conditions where this foam is stabilized by use of nanoparticles in a liquid phase. For purpose of illustration, the features of FIG. 2 are not drawn to scale. Foam generator 200 may be provided as a one-on-one mixer allocated to an individual well, or the foam generator 200 may be allocated to a plurality of the injection wells and connected to these wells by surface piping (not shown) that connects these injection wells to the foam generator 200. The foam generator 200 discharges foam or materials that will later be mixed into foam into a tubular body 202. A valve or pressure regulator 204 receives these foam materials at a design pressure intended for foam flooding operations, transferring these foam materials into injection tubing 206 the injection tubing 206 proceeds through tubing hanger 208 and through wellbore to 210, which is protected by surface casing 212 and production casing 214. Injection tubing 206 stings through packer 216 to discharge foam 218 into oil reservoir 220. It will be appreciated that the portion of production casing 214 in area 222 has been perforated by the action of shaped charges as are known in the art for purposes of establishing flow communication into oil reservoir 220. The particular hardware shown in the instance of injection well 106 is utilized to show merely one example of structure that might be utilized in an injection well. Injection well structure may be governed by applicable state and federal regulations, and these regulations may vary from state to state. Generally, the injection wells will be constructed as standard injection wells that meet established practices and regulatory requirements as may be applicable in any particular environment of use.

The foam mixer 200 may be constructed and arranged for the injection of premixed foam into tubular body 202. The discharge point 224 may be at any depth within wellbore 210 for presentation of suitable quality foam by design at area 222, i.e., at the transition between production casing 214 and oil reservoir 220. Alternatively, the tubular body to two and production tubing 206 may maintain separately the liquid and gas phases of the foam for subsequent in-line mixing to generate foam downhole. Thus, tubing segment 226 may include an internal turbulator, such as fins, (not shown) to assure adequate mixing for purposes of in-line injection. It is possible for example to provide the reduction tubing 206 has two separate strings of production tubing each discharging into a single tubing segment 226 for purposes of in-line mixing.

It is possible to utilize $CO_2$ at any supercritical condition for purposes of the presently disclosed instrumentalities. Conditions of 1300 psia and 40° C. were selected for use in these experiments because these conditions place $CO_2$ in a supercritical state and these conditions are representative of a range of conditions normally encountered in foam flooding operations. Again, it is possible to inject predetermined quantities of liquid and supercritical $CO_2$ to produce a foam achieving a target quality at bottom hole conditions. Generally speaking, due to the smallness of foam micelles, it is not necessary to maintain the $CO_2$ in a supercritical state at all times on the journey downhole. By way of example, a 95% quality foam may be injected at about 1100 psia to achieve a foam in the target range of 80% to 90% at a bottom hole depth of 5000 feet. This change in foam quality occurs due to hydrostatic head of the foam with a resulting decrease in the volume of gas. However, this type of surface injection arrangement then necessarily requires the foam generator 200 to discharge foam at 1100 psia. If the liquid phase of the foam is a brine that produces a hydrostatic head of 0.465 psi per foot, then a roughly equivalent injection pressure may be obtained by mixing foam constituents downhole at a depth of 2365 feet (1100 psi/0.465 psi/foot).

Figure 3:
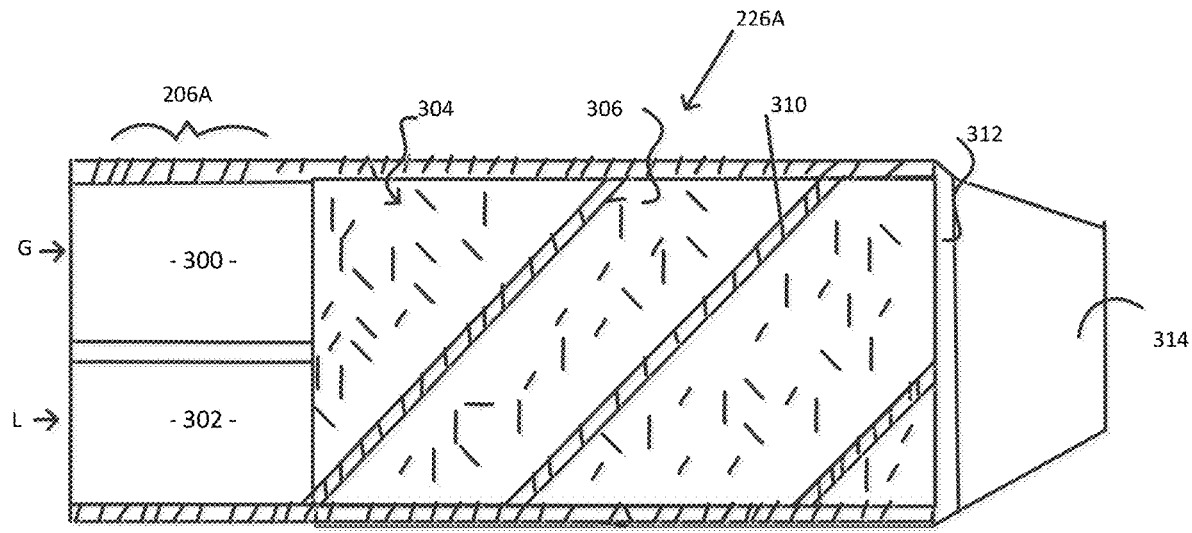
FIG. 3 shows an inline mixer according to one embodiment.

The liquid phase may be mixed separately from the gas phase and subjected to inline mixing. FIG. 3 shows an inline mixer 226A that may be used in place of tubing section 226 shown in FIG. 2. Here the tubing 206A includes a first tubing 300 and a second tubing 302. The tubing 300 is coupled with a gas supply G and a liquid supply L, where the foam generator 200 (see FIG. 1) separately governs the gas and liquid flow rates. Generally, the generated foam will have the required foam quality if the foam generator 200 provides a volume of gas and a volume of liquid that, if mixed at bottom hole conditions accounting for the volumetric change in the gas at bottom hole temperature and pressure, will provide a foam quality according to foam flood design parameters. Tubing 300, 302 discharges into mixing chamber 304 and then winds through a microporous material 306, such as a sand pack or porcelain This material may, for example, permit the passage of particles of a predetermined size range, such as from 5 μm to 20 μm. An optional helical wall 310 may be provided to assist with turbulation mixing. A screen 312 retains the microporous material leading to discharge cone 314. The turbulation device 226A does not need to be used in place of tubing segment 226 and may, instead, be provided in place of tubular body 202.

System Design

Figure 4:
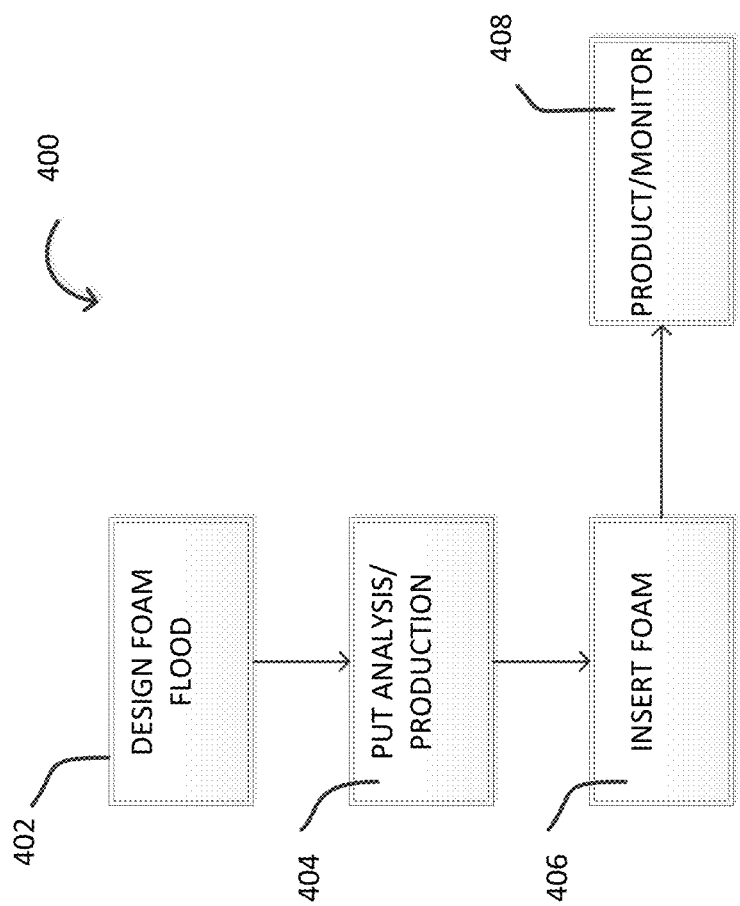
FIG. 4 is a process schematic of a foam flooding process.

FIG. 4 is a process schematic of the design process 400 for foam flooding. Foam floods are known to the art and may be designed according to conventional methods. Flood design 402 may be facilitated, for example, by use of commercially available software such as $CO_2$-EOR and Sequestration Planning Software from NITEC LLC of Denver, Colo. or STARS™ by Computer Modeling Group of Houston Tex. Foam quality at bottom hole conditions for the flood is projected by pressure-volume-temperature (PVT) analysis 404, such as by using Equation (1) to estimate gas volumetric behavior or another correlation more amenable to supercritical $CO_2$. In most circumstances, but not all circumstances, the compressibility of gas or supercritical fluid will dominate the system compressibility because the liquid phase is relatively incompressible.

Table 1 below provides percentage constituents, including preferred ranges of constituents, for the manufacture of foam according to the presently disclosed instrumentalities.

| Phase | Constituent | Content | Mixing ratio |
|---|---|---|---|
| Liquid | Surfactant | 0.01 to 5 wt % of liquid phase | Ratio of surfactant to combined weight of cationic and anionic polyelectrolyte material ranges from 3:1 to 9:1. |
| | Polycationic polyelectrolyte material | 0.01 to 5 wt % of liquid phase 0.01 to 5 wt % is preferred for foam flooding | |
| | Polyanionic polyelecrolyte material | 0.01 to 5 wt % of liquid phase 0.01 to 5 wt % is preferred for foam flooding | |
| | Acid/Base | (Optional) | Sufficient to adjust liquid phase pH to a value from 5 to 9. |
| | Water | | Balance of liquid phase* |

-continued

| Phase | Constituent | Content | Mixing ratio |
|---|---|---|---|
| Gas/ Super- critical fluid | $CO_2$ is preferred, but $N_2$ or hydrocarbon gases would work as well | | Sufficient to provide a foam quality of from 80% to 90% at bottom hole conditions of temperature and pressure. The foam quality may be 60% to 90% if the foam is used in hydraulic fracturing operations. |

*Although water is indicated as the balance of the aqueous phase, this does not preclude mixing additional materials with the water that are not disclosed in Table 1. These additional materials may be any compatible oilfield materials, such as corrosion inhibitors which may be carboxylates or weak carboxylic acids, antimicrobial agents, salts, and chemicals utilized to treat reservoir rock as are known in the art. These additional materials may be utilized as prescribed by their respective manufacturers.

Surfactants are normally organic materials with amphiphilic properties. Surfactants include classes of anionic, nonionic, cationic, and zwitterionic surfactants. Commercial surfactants produced worldwide on large scale commercial basis include soaps, linear alkylbenzine sulfonates, lignin sulfonates, fatty alcohol ethoxylates, and alkylphenol ethoxylates. Anionic and nonionic surfactants are particularly preferred for use in the aforementioned foam because these classes of surfactant are particularly amenable to foam formation use of inline injection, and such foams demonstrate enhanced stability under the conditions encountered in oil reservoirs.

Anionic surfactants include generally sulfates, sulfonates, phosphate esters, and carboxylate. Specific examples of anionic surfactants include ammonium lauryl sulfate, sodium lauryl sulfate or sodium dodecyl sulfate, sodium laureth sulfate or sodium lauryl ether sulfate, sodium myreth sulfate, dioctyl sodium sulfosuccinate, perfluorooctanesulfonate, perfluorobutanesulfonate, the alkyl-aryl ether phosphates, and the alkyl ether phosphates.

Nonionic surfactants include the fatty alcohols, such as cetyl alcohol, stearyl alcohol, cetostearyl alcohol and oleyl alcohol. Other nonionic alcohols include, for example, polyoxyethylene glycol alkyl ethers, octaethylene glycol monododecyl ether, pentaethylene glycol monododecyl ether, polyoxypropylene glycol alkyl ethers, glucoside alkyl ether, decyl glucoside, lauryl glucoside, octyl glucoside, polyoxyethylene glycol octylphenol ethers, polyoxyethylene glycol alkylphenol ethers, glycerol alkyl esters, glyceryl laurate, polyoxyethylene glycol sorbitan alkyl esters such as polysorbate, sorbitan alkyl esters, dodecyldimethylamine oxide, block copolymers of polyethylene glycol and polypropylene glycol suchas poloxamers, and polyethoxylated tallow amine.

Polycations are polyelectrolytes that disscosciate to form positively charged repeating units. Similarly, polyanions are polyelectrolytes that dissociate into repeating units of negative charge. Strong polyelectrolytes completely dissociate in water at intermediate pH values. Weak polyelectrolytes have a pKa generally in the range from −2 to −10 and, consequently, only partially dissociate at intermediate pH values but dissolve completely in their positively charged centers. Polyelectrolytes include, for example, chitosan and polyallylamine (PAAm). PAAm is a cationic polyelectrolyte that is available in different molecular weights sand contains primary amines.

WORKING EXAMPLES

A nonionic surfactant was purchased from Hunstman Corporation as N-120™ for use in the working examples reported below. The chemical name for this product is reported as poly(oxy-1, 2-ethanediyl), alpha-(nonylphenyl-omega-hydroxy) material. The N-120 was identified as Huntsman (Lot #E312D33, CAS #9016-45-9). The dominant N-120 molecule has twelve ethylene oxide (EO) groups. The theoretical molecular weight of the surfactant is 748 and the density was reported to be 1.066 g/ml at 25° C. The hydroxyl number for this nonionic surfactant is 75.

Polyethylenimine (PEI) was purchased on commercial order for use as the polycationic material. The structure of PEI may be generally described as being formed of the repeating electrolyte unit ethylamine. PEI is commercially available in different forms. Linear, branched and dendrimer forms are known in the art. A branched PEI was selected as a polycation with an average molecular weight of 25,000 being reported by the manufacturer. This form of PEI has a reported density of 1.03 g/ml at 25° C., and a viscosity between 13,000-18,000 cP at 50 degrees Celsius. The PEI was purchased from Sigma Aldrich (Lot #MKBN3988V, CAS #9002-98-6).

Dextran sulphate (DS) was used for the polyanionic material. DS is the sodium salt of anionic monomers made of sulfuric acid esters of the polysaccharide dextran. A form of DS having an average molecular weight of 500,000 was purchased from Sigma Aldrich (Lot #116614, CAS #9011-15-1) for use in the working examples reported below.

The liquid phase was provided as having 2 wt % potassium chloride (KCl) in water that was purified by reverse osmosis (RO) with deionization. The potassium chloride as purchased from Sigma Aldrich (Lot #0134C127, ACS Grade, CAS #7447-40-7).

The crude oil utilized in the view cell and core flood examples was Mississippian crude oil. The viscosity and density were measured to be 3.88 cP and 0.82 g/cc, respectively, at 40° C.

Lansing Kansas City (LKC) crude oil was used for view cell tests only. The measured viscosity and density of the Lansing oil were 5.86 cP and 0.83 g/cc respectively at 40° C.

Light mineral oil was used for the view cell tests to observe the interaction between the $CO_2$ foam system and oil. The viscosity and density of the light mineral oil were 15 cP and 0.84 g/cc, respectively, at 40 degrees Celsius.

Table 2 below summarizes the viscosities and densities measured at 40° C. for all the liquids used in working examples 1-4.

TABLE 2

Summary of the viscosities and densities of the samples used in the experiments 1-4.

| Sample | Temperature (Celsius) | Density (g/cc) | Viscosity (Cp) |
|---|---|---|---|
| Brine (2 wt % KCl) | 40.00 | 1.00 | 0.81 |
| Surfactant Solution | 40.00 | 1.01 | 1.24 |
| PEI Surfactant Solution | 40.00 | 0.97 | 0.72 |
| NP-Surfactant Solution | 40.00 | 1.06 | 0.71 |
| PECNP-Surfactant diluted 10 times with 2 wt % KCl | 40.00 | 1.00 | 0.63 |
| Light Mineral Oil | 40.00 | 0.84 | 15.00 |
| LKC Crude oil | 40.00 | 0.83 | 5.86 |
| Mississippian Crude oil | 40.00 | 0.82 | 3.88 |

Indiana Limestone outcrop cores were purchased from Kocurek Industries, and used to obtain the results reported below. The length and diameter of the cores were 12 inches and 1.5 inches, respectively. The cores were cut to the desired length before the experiments. The permeability for these cores were typically between 250-350 mD.

Example 1

Characterization of Liquid Materials

Figure 5:
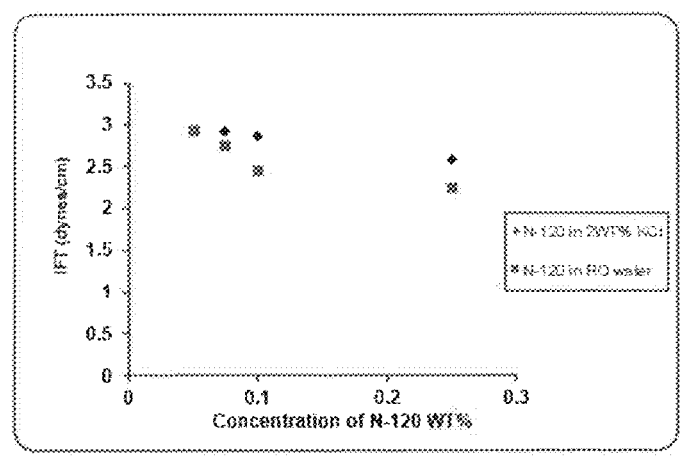
FIG. 5 is a plot showing critical micelle concentration (CMC) by comparison of interfacial tension (IFT) vs. concentration for N-120 solutions prepared in R.O. water and 2% KCl in which a sudden change in the slope corresponds to the CMC of the surfactant solution.

Critical micelle concentration. FIG. 5 shows the critical micelle concentration (CMC), which was determined using the method reported by Kristen and v. Klitzing (2010) for the surfactant solution in brine. All samples utilized in these examples were maintained below the CMC. Polyelectrolytes have an overlap concentration above which they begin to form a network and hence the concentration of PEI is also below the overlap concentration. The CMC was slightly higher than 0.1 for the N-120 surfactant.

A PEI Solution was prepared by adding PEI to the brine solution, forming 500 ml of 1% by weight PEI. The pH of this PEI solution was subsequently lowered to 8 by addition of 3.2 ml of 6N HCl.

A DS Solution was prepared by adding DS to brine, forming a 1 wt % DS solution. Four different batches of nanoparticles were used during the course of this study by mixing the 1% PEI Solution with the 1% DS Solution at PEI:DS ratios of 1, 2, 3, and 4.

A nanoparticle (NP Solution) was prepared by mixing the PEI Solution and the DS Solution by volume in the ratio of 3:1:0.1 of PEI Solution:DS Solution:brine. The NP Solution was stirred for 20 minutes at 600 rpm.

PEI-Surfactant Solution and NP-Surfactant Solution: These surfactant solutions were prepared by mixing N-120 surfactant in brine to a concentration of 0.1 wt % surfactant. The PEI-Surfactant Solution contained 1% PEI:surfactant at a ratio of 1:9 by volume. The NP Surfactant Solution contained a combination of polyelectrolyte material including PEI and DS at a ratio of 1:9 by volume (polyelectrolyte: surfactant). All the solutions were stirred in a 500 ml beaker at 600 rpm for 20 minutes.

The best ratio of the PEI:DS and the best pH of PEI were determined based on testing for the zeta potential and particle size measurements utilizing the Brookhaven Zeta-PALS™ instrument. This instrument works on the principal of Brownian movement. The diameter and electrical double layer are measured using dynamic light scattering (DLS). Zeta potential or the electrokinetic potential is the measure of the electrokinetic motion of the particles away from the charged inner surface within the electrical double layer. Stability of the polyelectrolyte system depends on the zeta potential values. High zeta potential values correspond to stronger electrostatic repulsion which results in a more stable nanoparticle system.

Table 3 below summarizes the Zeta potential values and the effective diameter of the nanoparticles. It can be observed that the highest zeta potential value is obtained for batch number 3 with PEI (1 wt %, pH 8). Higher zeta potential values indicate a stronger electrostatic repulsion thereby stabilizing the system. The particle size is controlled by the ratio of the PEI (1 wt %):DS (1 wt %) and also the pH of the PEI (1 wt %). Therefore the nanoparticle constituents from batch 3 with PEI (1 wt %, pH 8) was used for all further testing. It will be appreciated that this example teaches by way of example and not by limitation. Accordingly, zeta potential may be similarly optimized by using different ratios of pH to polyelectrolyte in the presence of different surfactants.

TABLE 3

Summary of zeta potential and DLS particle size measurements for different batches of the NP-surfactant system. The system with the best ratio and the best pH is highlighted in bold.
PECNP-Surfactant

| Batch | pH of PEI (1 wt %) | Effective Diameter (nm) | Polydispersity | Zeta Potential (mV) |
|---|---|---|---|---|
| 1 | 8 | 442.00 ± 0.92 | 0.36 | 8.73 ± 9.55 |
| 1 | 8.5 | 234.53 ± 4.41 | 0.20 | 14.26 ± 6.12 |
| 1 | 9 | 327.28 ± 3.17 | 0.21 | 8.66 ± 3.17 |
| 2 | 8 | 167.35 ± 0.67 | 0.21 | 1.14 ± 6.48 |
| 2 | 8.5 | 140.47 ± 0.16 | 0.19 | 10.29 ± 1.7 |
| 2 | 9 | 215.78 ± 3.98 | 0.33 | 8.73 ± 5.84 |
| 3 | 8 | 155.00 ± 1.88 | 0.17 | 22.20 ± 3.38 |
| 3 | 8.5 | 162.17 ± 0.83 | 0.19 | 21.47 ± 5.64 |
| 3 | 9 | 146.58 ± 1.33 | 0.21 | 13.68 ± 8.13 |
| 4 | 8 | 190.59 ± 1.72 | 0.22 | 9.59 ± 12.38 |
| 4 | 8.5 | 175.62 ± 0.49 | 0.21 | 9.72 ± 5.04 |
| 4 | 9 | 173.63 ± 2.04 | 0.22 | 15.36 ± 6.3 |

Example 2

View Cell Testing

Figure 6:
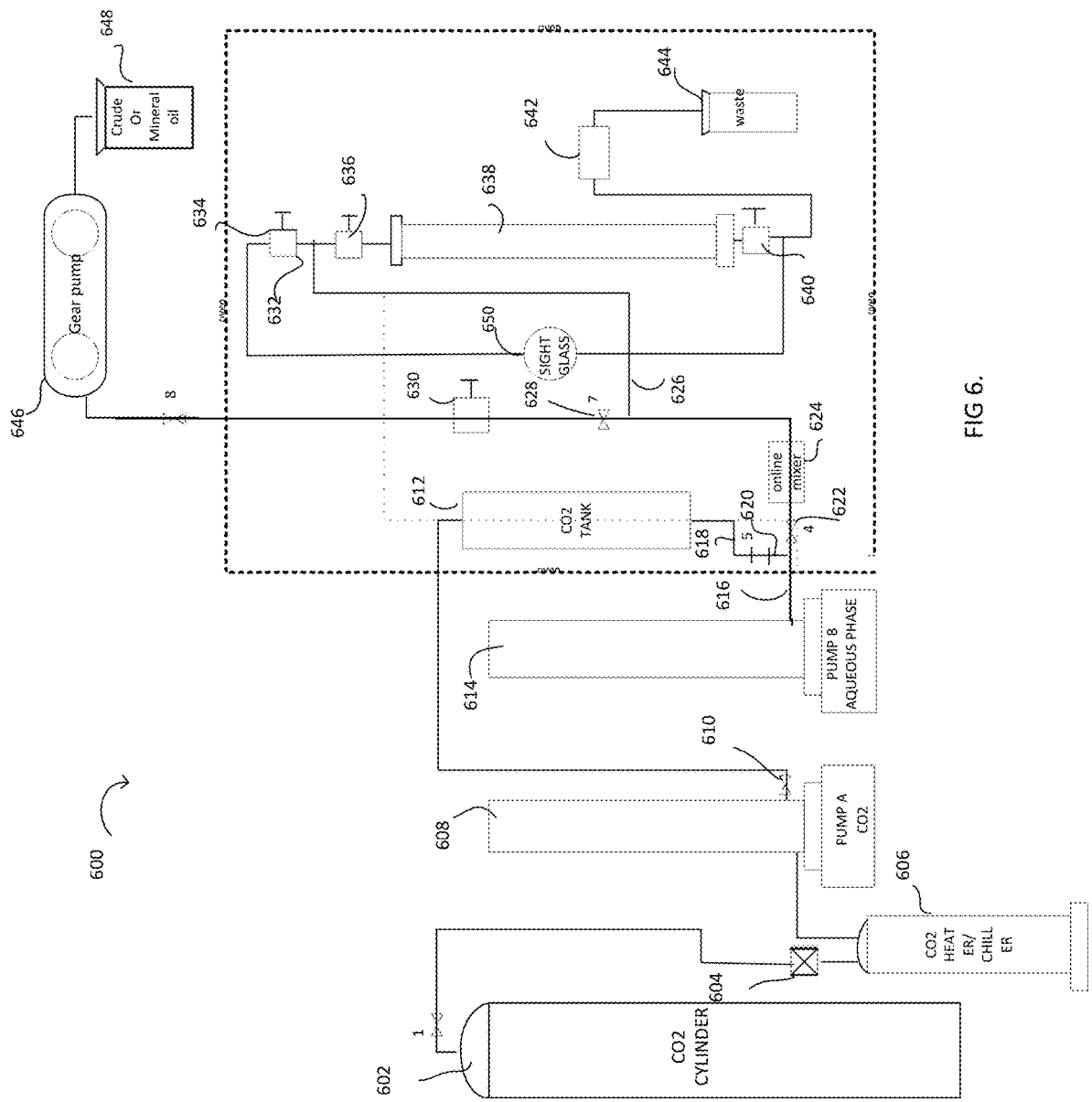
FIG. 6 shows an experimental setup for use in view cell testing according to one embodiment.
Figure 7:
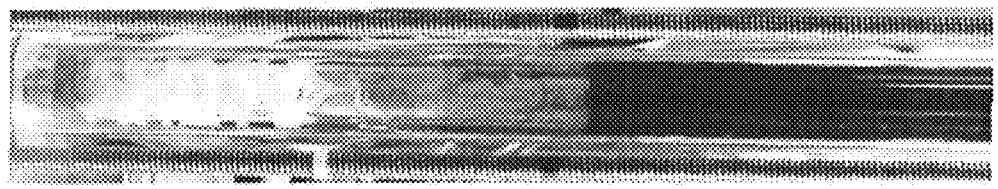
FIG. 7 shows interaction between $CO_2$ foam generated by PECNP Surfactant Solution and Mississippian crude oil.
Figure 8:
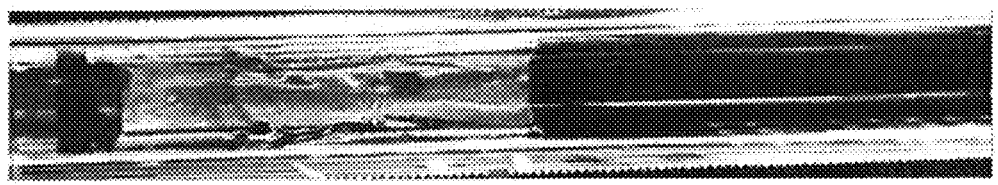
FIG. 8 shows interaction between $CO_2$ foam generated by PEI Surfactant Solution and Mississippian crude oil.
Figure 9:
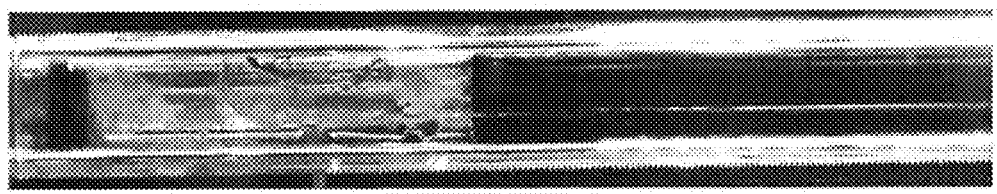
FIG. 9 shows interaction between $CO_2$ foam generated by Surfactant Solution and Mississippian crude oil.
Figure 10:
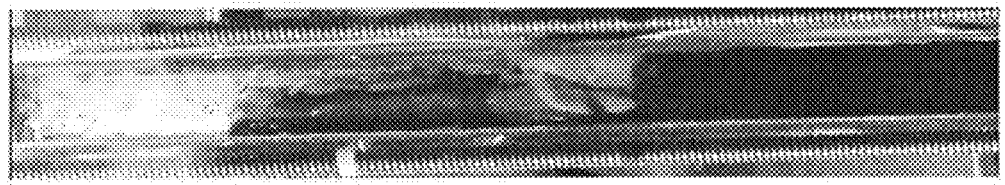
FIG. 10 shows interaction between $CO_2$ foam generated by PECNP Surfactant Solution and LKC crude oil.
Figure 11:
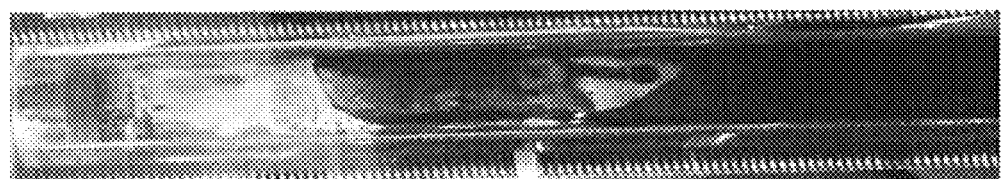
FIG. 11 shows interaction between $CO_2$ foam generated by PEI Surfactant Solution and LKC crude oil.
Figure 12:
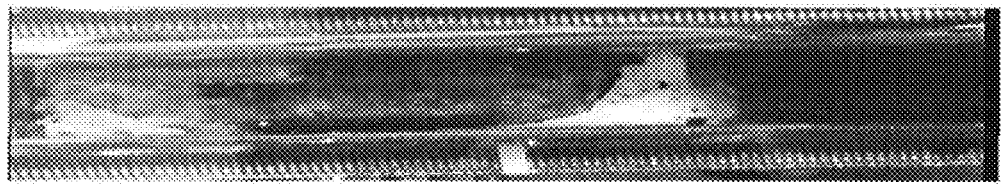
FIG. 12 shows interaction between $CO_2$ foam generated by Surfactant Solution and LKC crude oil.

A sapphire view cell was used to observe the interaction between oil and foam generated by mixing select non-hydrocarbon liquids from Example 1 with $CO_2$. As shown in FIG. 6, the experimental setup 600 included a $CO_2$ supply cylinder 602 flowing through flow regulator 604 into a heater/chiller 606 configured to place the $CO_2$ in a supercritical state. The heater/chiller 606 discharged into $CO_2$ pump 608 (ISCO) which, in turn, discharged through valve 610 into $CO_2$ tank 612. A liquid pump 614 discharged aqueous material for making foam through line 616, which communicated also with discharge from $CO_2$ tank 612 through line 618 and valve 620. The combined output of $CO_2$ and liquid phase materials passed through valve 622 and inline mixing station 624. The resulting foam passed to line 626 by operation of check valve 628 and ball valve 630 for discharge at junction 632. Selective positioning of ball valves 634, 636 permitted the foam to pass through a sapphire view cell 638 for discharge through ball valve 640. A backpressure regulator 642 maintained internal system pressure prior to discharge of this flow pathway into waste receptacle 644.

Selective positioning of valves 632, 636, 640 permitted introduction of hydrocarbon liquid (crude oil or mineral oil) use of generated $CO_2$ foam column and oil. Thus, it was possible to observe the interaction of foam and hydrocarbon liquid in the sapphire view cell 638.

The experimental setup 600 was designed to withstand high temperatures and pressure. For flow experiments, the internal pressure and temperature was maintained at 1300 psi and 40° C. Baseline tests were conducted with no oil in the system initially, by filling the sapphire view cell 638 cell with the corresponding PEI Surfactant Solution or PENCP Surfactant Solution as described above. The foam decay between the generated $CO_2$ foam column and aqueous phase are monitored. $CO_2$ at supercritical conditions was used for these experiments.

After the baseline tests, the $CO_2$ foam systems were tested with light mineral oil and crude oil. The gear pump 646 was used to fill the view cell with crude oil or light mineral oil initially. The system was then pressurized up to 1300 psi. The aqueous phase and the supercritical $CO_2$ were allowed to flow through a 7 micron inline mixer 624 and allowed to pass through a sight glass 650 for about ten minutes or until 30 ml of foam was generated. The foam was then bypassed into the sapphire view cell 638 by selective actuation of valves 634, 636, 640 until the view cell was half full upon which the valves were closed for foam decay observations It was observed that for a system without oil, the $CO_2$ foam generated utilizing PEI Surfactant Solution as the liquid phase had a longer lasting foam than did the PECNP Surfactant Solution. However the presence of light mineral oil or crude oil resulted in the $CO_2$ foam generated by PECNP Surfactant Solution to be much more durable than the other two systems. The $CO_2$ foam generated by PEI Surfactant Solution generated a stronger lamellae. However when the same foam contacted crude oil or light mineral oil, the foam tended to destabilize.

Further, each of the $CO_2$ foam systems behave differently with different types of oils, i.e. the foam durability is affected by the composition of the oil and its viscosity. Interestingly, the viscosity of the light mineral oil is more than the LKC crude oil, which is much more than the viscosity of the Mississippian crude oil. Results show that foam stability associated with use of PECNP Surfactant Solution increases with increasing viscosity of the oil.

From the view cell tests, it can be observed that the $CO_2$ foam generated by PECNP-surfactant is more durable compared to the PEI-surfactant and surfactant only $CO_2$ foam systems in the presence of crude oil. FIGS. 7-12 show the $CO_2$ foam generated by the three different systems and their interaction with Mississippian crude oil and LKC crude oil after 1 minute of isolating the view cell from the rest of the experimental setup. Table 4 below lists the time duration for the foam to decay completely for each of the systems. Clearly, for the same volume of foam generated, the foam from the PECNP-surfactant is much more distinct compared to the other two systems. Thus the PECNP-surfactant generated foam has a more stable foam front and this was observed during the generation process when it pushes the oil through the outlet before the view cell was isolated.

TABLE 4

Time for different $CO_2$ foam systems to decay completely upon interacting with LKC crude oil, Mississippian crude oil, and light mineral oil, and without any oil in the view cell.

| System injected | Without oil in the cell (minutes) | With light mineral oil (minutes) | With LKC crude oil (minutes) | With Mississippian crude oil (minutes) |
| --- | --- | --- | --- | --- |
| $CO_2$ foam, surfactant generated | 75 | 24 | 8 | 1 |
| $CO_2$ foam, PEI-surfactant generated | 86 | 16 | 3 | 1 |
| $CO_2$ foam, PECNP-surfactant generated | 60 | 31 | 20 | 10 |

Example 3

Rheology Measurements

The viscosity of the three systems of $CO_2$ foam which include: surfactant generated $CO_2$ foam, PEI Surfactant Solution generated $CO_2$ foam, and PECNP Surfactant Solution-$CO_2$ foam measured using a rheometer purchased on commercial order from Anton Paar.

Figure 13:
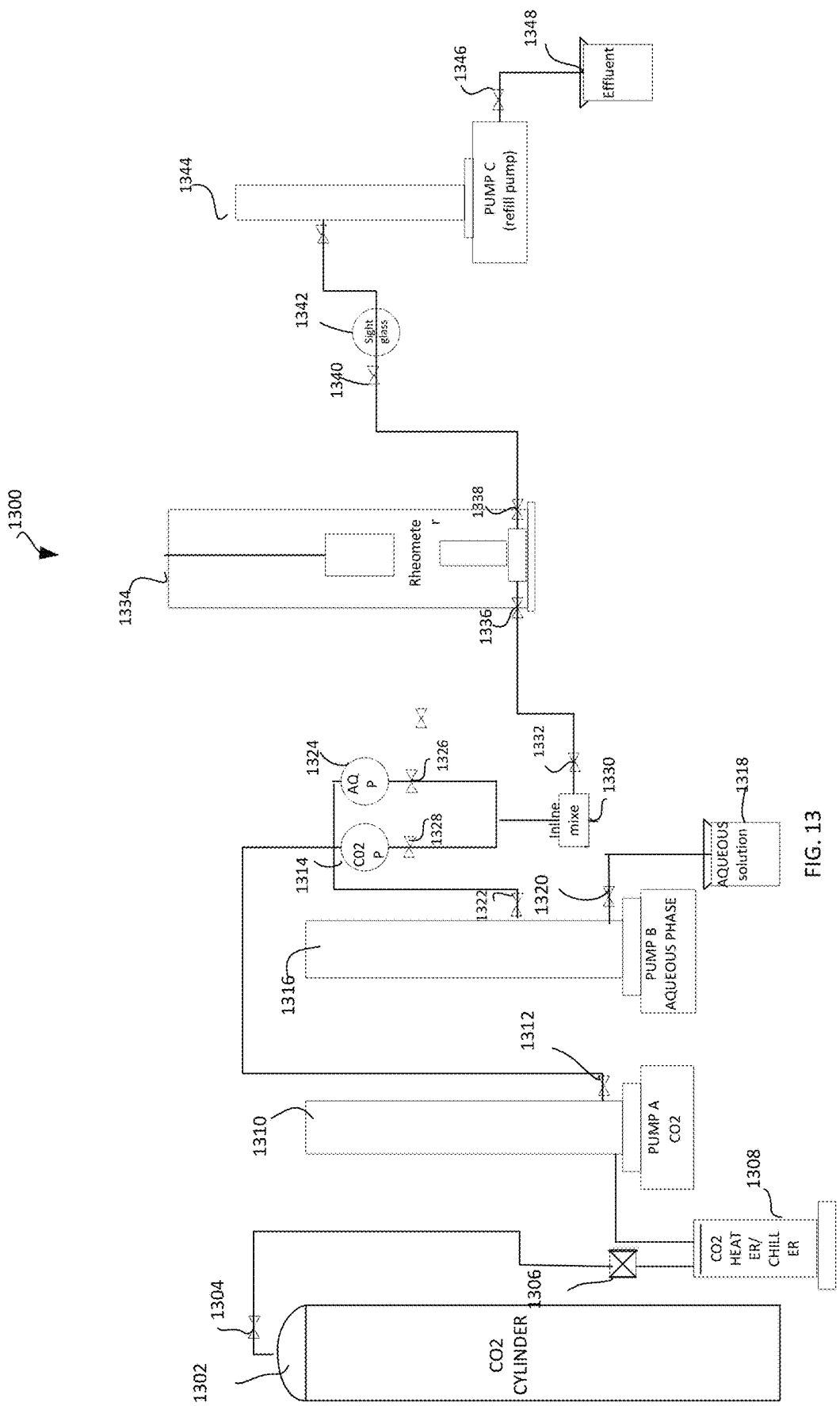
FIG. 13 shows an experimental setup used in rheology experiments.

FIG. 13 shows the experimental setup 1300 used to understand the rheology of the $CO_2$ foam. A $CO_2$ cylinder 1302 flowed $CO_2$ through valve 1304 and regulator 1306 into a heater/chiller 1308 that assured use of supercritical conditions, namely, the entire experiment being conducted at 1300 psi and 40° C. $CO_2$ in its supercritical state flowed through $CO_2$ pump 1310 and valve 1312 into $CO_2$ reservoir 1314. Pump 1316 and valve 1320 provide a liquid solution for use in foam making 1318 through valve 1322 to liquid reservoir 1324. Opening of metering valves 1326, 1328 provide $CO_2$ and liquid to in line mixer (7 µm) 1330, which discharged foam through valve 1332 to rheometer 1334. Valves 1336, 1338. 1340 are selectively positionable to govern flow through the rheometer 1334.

The pumps 1310, 1316, 1344 were purchased on commercial order from Teledyne ISCO of Lincoln, Nebr. In the rheometer 1334, a measurement/pumping volume was formed of two co-axial cylinders and the annulus between these cylinders was filled with $CO_2$ foam. The outermost cylinder was rotated by a magnetic motor that provided torque values up to 300 mNm. Pump 1344 was used to withdraw the foam through valve 1346 and effluent receptacle 1348 at the same rate it was being injected into the rheometer 1344, thereby forming a closed loop.

A dynamic test was conducted utilizing the rheometer 1334 at 2000 s$^{-1}$ shear rate for 140 measuring points with a 30 second interval and a predetermined flow rate of $CO_2$ foam. This lasted for about 70 minutes. Once the dynamic test was completed at the desired flow rate, the rheometer 1344 was isolated by actuation of valves 1336, 1338. The foam in the measuring cup was allowed to shear again at 2000 s$^{-1}$ shear rate for the same parameters as mentioned above. There was no continuous generation of foam at this point, and the viscosity of the foam was measured under shear with time for another 70 minutes. The dynamic test had two different kinds of forces that help in the continuous increase of the viscosity with time under the same constant shear, namely, tangential force and normal force. The tangential force was applied by the continuous generation of the foam and the normal force was applied by the rheometer.

Figure 14:
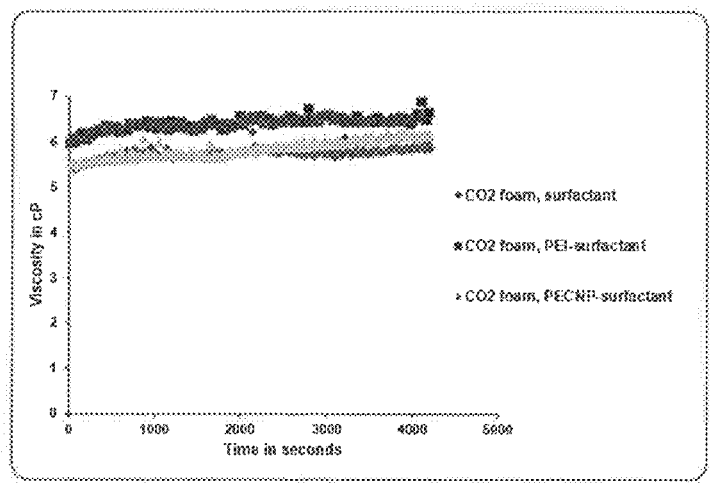
FIG. 14 shows change in foam viscosity with time under a constant shear of 2000 s−1 after a rheometer was isolated from the rest of the setup with no additional generation of foam.

Viscosity of the different $CO_2$ foam systems were compared with time under a constant shear rate of 2000 s$^{-1}$, as shown in FIG. 14. During the static test, the foam that was already generated was sheared constantly to observe the viscosity. This generated data that was used to understand the foam system qualitatively compared to the dynamic test. At a shear of 2000 s$^{-1}$, the viscosity increased slightly for all the three systems, with the PEI Surfactant Solution generated $CO_2$ foam having the highest viscosity.

A shear sweep test was conducted to observe the effect of shear on the $CO_2$ foam for the different systems. The Ostwald and de Waele power law provides a relationship between apparent viscosity and shear rate which could be applied for non-Newtonian fluids.

$$\mu_{app} = K\gamma^{n-1}$$

where:
$\mu_{app}$ = apparent viscosity, cP;
K: power law/flow consistency index;
γ: shear rate;
n: power law exponent; and The rheology testing showed that the PEI-surfactant $CO_2$ foam had the highest viscosity under a constant shear rate of 2000 s$^{-1}$ and the PECNP-surfactant $CO_2$ foam had a higher viscosity than the surfactant $CO_2$ foam. The shear sweep test indicated that the PECNP-surfactant $CO_2$ foam would have a more stable foam compared to the other two systems. Table 5 below summarizes the values of the power law exponent and consistency index for the three different $CO_2$ foam systems. The foams are pseudoplastic in nature. The flow consistency index is the highest for the $CO_2$ foam generated by the PECNP Surfactant Solution system, and the power law exponent is the highest for the $CO_2$ foam generated using the PEI Surfactant Solution system. This showed that the PECNP Surfactant Solution foam system had a more favorable rheology compared to the other two systems because it had a lower power law exponent and, consequently, the foam did not become as thin with shear compared to the other two systems. This provides a higher flow consistency that improves foam stability.

TABLE 5

Using the power law model for non Newtonian fluids, the power law consistency index and flow behavior index are calculated for three $CO_2$ foam systems.

| System | N | K | $R^2$ |
|---|---|---|---|
| $CO_2$ foam, surfactant | 0.38 | 0.58 | 0.98 |
| $CO_2$ foam, PEI (1 wt %, pH 8)-surfactant | 0.39 | 0.60 | 0.97 |
| $CO_2$ foam, PECNP-surfactant | 0.34 | 0.80 | 0.98 |

Example 4

Core-Flood Experiments

An experimental setup was constructed for core flood experiments using an inline mixer to generate foam including supercritical $CO_2$ as described above. For these experiments the foam was injected at superficial velocity of 12.4 feet/day (3 ml/minute). The $CO_2$ foam quality was maintained at 90% for all the $CO_2$ foam tests.

All cores were dried at 75 degrees Celsius for 48 hours. The dry weight of the core was measured every hour until the weight was constant. The core was placed inside a vertical core holder and was isolated from the rest of the system. The core was subjected to until a pressure reading of −30 psi was attained for 35 minutes. Brine was allowed to saturate the core through suction. The volume of brine imbibed by the core is measured, and the porosity of the core was calculated.

A ten inch Indiana Limestone core was used for these tests to study foam flooding in the absence of oil. All of these tests were conducted at a system pressure of 1300 psi with a simulated overburden/confining pressure of 1800 psi. Temperature was maintained at 40° C. by use of an oven. Permeability of the core was measured by injecting brine at three different flow rates to measure the pressure drops corresponding to these flow rates. The pressure-flow data was used to calculate permeability according to Darcy's Law. After measuring the permeability of the core, five pore volumes of surfactant were injected at different flow rates to measure the pressure drops across the core. Supercritical $CO_2$ (90% foam quality) was injected along with the surfactant, and this was allowed to foam inside an inline mixer before entering the core. Volume of $CO_2$ foam injected through the period of the test was 113 ml. Brine was injected after this test to clean the core, and the permeability was measured again.

Five pore volumes of PEI Surfactant Solution was injected into the same core once the permeability was measured. This was followed with 90% quality $CO_2$ foam generated by PEI Surfactant Solution. After injecting 113 ml of foam, the core was cleaned with brine and the permeability was measured once again.

Figure 15:
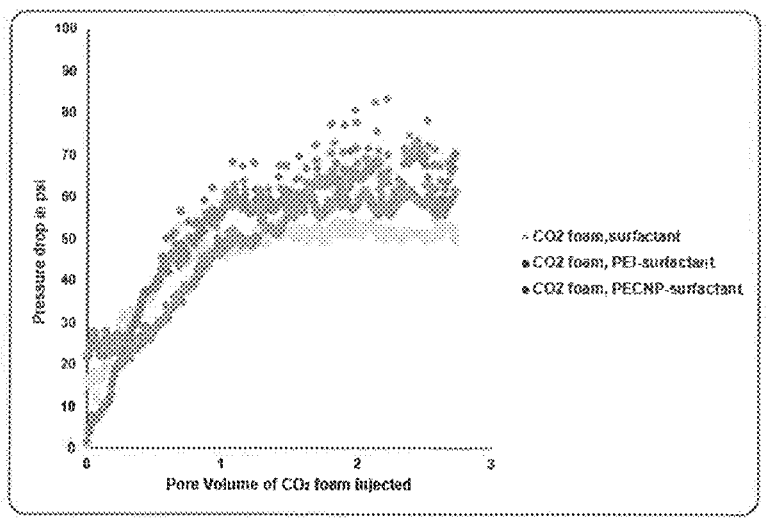
FIG. 15 provides a comparison between the pressure drops across a whole core specimen versus time for three different $CO_2$ foam system.

Pressure drop across the whole core for the foam generated by PEI Surfactant Solution was the highest followed by the PECNP Surfactant Solution-based foam, as demonstrated in FIG. 15. This was predictable based upon the rheology of the three systems. The PECNP Surfactant Solution foam started with a higher pressure drop, although it did not peak as high as did the PEI Surfactant Solution foam. This suggests that the higher pressure drop was correlatable to a stable foam front.

Nanoparticles Cause Negligible Damage to Permeability

Following the above tests, PECNP Surfactant Solution was injected in to the same core for five pore volumes, after which 90% quality $CO_2$ foam generated by use of PECNP Surfactant Solution was injected. Lastly, the core was cleaned with brine, and the permeability was measured.

The extent of damage to the core due to the presence of nanoparticles was tested by continuously injecting a 100% solution of PECNP-surfactant that was diluted by 10 times in brine, without the generation of $CO_2$ foam. This dilution was done because the 90% quality foam included only 10% of the surfactant solution in all three of the $CO_2$ foam systems. A smaller core holder was used for this purpose, and the permeability of a 3 inch core was measured before and after the injection of 10 pore volumes of the 10× diluted PECNP Surfactant Solution.

The extent of damage to the core due to the continuous injection of 100% PECNP-Surfactant Solution, diluted 10 times to represent the final concentration of nanoparticles in the foam system in the absence of $CO_2$ foam was studied. The final permeability values are reported below in Table 6, representing and a mere 0.015% decrease in permeability. This extent of damage to permeability was negligible.

TABLE 6

Summary of the permeabilities before and measured after continuous injection of 100% PECNP-Surfactant Solution in the absence of $CO_2$ foam generation to measure permeability recovery.

| System Temperature (Celsius) | System Pressure (psi) | Viscosity (cP) | Permeability (mD) |
|---|---|---|---|
| 40 | 1300 | 0.81 | 224.24 |
| 40 | 1300 | 0.81 | 220.97 |

Six Indiana Limestone cores from the same block were utilized in $CO_2$ foam test with crude oil in the system. The cores were saturated with brine using the core saturation method described above. The porosities and permeabilities of each of these cores were measured. Three cores having the closest porosity and permeability were chosen for the subsequent tests. The objective of the tests was to compare the oil recovery for different $CO_2$ foam systems. Table 7 below summarizes the porosity, permeability, pore volumes and bulk volumes of the three cores used.

TABLE 7

Summary of the porosity, permeability, pore volume and bulk volume of the three cores that were chosen for the core flood tests with crude oil.

| | Permeability (mD) | Porosity | Pore volume (ml) | Bulk volume (ml) |
|---|---|---|---|---|
| Core #1 | 292 | 0.19 | 50.16 | 260.62 |
| Core #2 | 356 | 0.16 | 42.00 | 260.62 |
| Core #3 | 387 | 0.17 | 45.00 | 260.62 |

Core flood experiments conducted in the presence of Mississippian crude oil, as reported below, showed that the PECNP Surfactant Solution $CO_2$ foam recovers more oil compared to the other two $CO_2$ foam systems. Also, within a single core when $CO_2$ foam generated by surfactant ceases to produce more oil, the injection of PECNP-surfactant $CO_2$ foam followed by PEI-surfactant $CO_2$ foam produces additional oil. The following testing procedures were used for each core:

Primary Drainage:

Mississippian crude oil was injected at 0.5 ml/minute into the brine saturated core until no more brine was produced. The volume of brine collected was noted and this was the volume that was replaced by crude oil inside the core. In addition to the volume of the brine, the volume of the crude oil injected and produced were also noted to estimate the initial oil saturation with material balance calculation. An ambient system pressure and 500 psi of overburden/confining pressure was applied. The temperature of the oven was maintained at 40° C.

Water Flooding:

Brine was injected at 0.5 ml/minute until no more oil was produced. The volume of oil produced was noted and the residual oil saturation was calculated based on the volume of brine that replaced the oil. The system pressure was still maintained at an ambient pressure and an overburden/confining pressure of 500 psi. The temperature of the oven was maintained at 40° C.

$CO_2$ Foam Flooding:

The system was water flooded with brine before the start of the $CO_2$ foam test to pressurize the core up to 1300 psi. No oil was produced during this waterflood since it was a continuation of the previous test. The aqueous phase of alternatively: (1) Surfactant Solution, (2) PECNP Surfactant Solution or (3) PEI Surfactant Solution, was mixed with supercritical $CO_2$ through and inline mixer before it passed through the core. The volume of oil produced along with other fluids was measured at the system outlet. Each $CO_2$ foam test was followed with a waterflood with brine up to 5 pore volumes to clean the core. No more oil was produced during this last waterflooding phase.

Core #1:

The primary drainage and waterflooding tests were completed using the above described method and were followed with the injection of $CO_2$ foam generated by surfactant. The oil recovered was monitored and the residual oil saturation was calculated. This test was followed with a waterflood to displace the $CO_2$ trapped in the core. Once the waterflood was completed, it was followed by $CO_2$ foam generated by PECNP Surfactant Solution. This was done to determine the possibility of recovering more oil after the $CO_2$ foam generated by surfactant. The core was cleaned by waterflooding and was followed with $CO_2$ foam generated by PEI Surfactant Solution. The different $CO_2$ foam tests conducted after the surfactant generated $CO_2$ foam were used to determine the additional volume of oil recovered for the same core.

Core #2:

Once the primary drainage and waterflooding tests were completed, $CO_2$ foam generated by PECNP Surfactant Solution was injected into the core. The oil recovered was monitored and the residual oil saturation was calculated. This test was used to compare the oil recovered through $CO_2$ foam generated by PECNP Surfactant Solution versus the oil recovered through $CO_2$ foam generated by surfactant in Core #1.

Following the $CO_2$ foam generated by PECNP Surfactant Solution, the core was injected with brine to displace the $CO_2$ trapped in the core. $CO_2$ foam generated by PEI Surfactant Solution was then injected into the core and the additional oil recovered is observed. This test was followed with a waterflood and then with $CO_2$ foam generated by surfactant.

Core #3:

For this core, once the primary drainage and waterflooding were completed, $CO_2$ foam generated by PEI Surfactant Solution was injected as the first enhanced oil recovery technique. The oil recovered was compared with the results of the $CO_2$ foam generated by Surfactant Solution (Core #1) and $CO_2$ foam generated by PECNP Surfactant Solution (Core #2).

Once the core was cleaned by waterflooding, it was injected with $CO_2$ foam generated by PECNP Surfactant Solution as the second foam injection. $CO_2$ foam generated by Surfactant Solution was injected as the last test to observe any additional oil recovery after the injection of the two other $CO_2$ foam systems.

Two different comparisons were made from these tests: (1) for the same core the additional oil recovered between the different $CO_2$ foam systems and between different cores, and (2) the oil recovered when different $CO_2$ foam systems were used as the first enhanced oil recovery technique after the waterflooding. Table 8 presents the pressure, temperatures and the order of experiments.

TABLE 8

List of core flood experiments and the order in which they were conducted for each core.

| Test | Pressure (psi) | Temperature (Celsius) |
|---|---|---|
| Core #1 | | |
| Primary Drainage | Ambient | 40 |
| Water flooding | Ambient | 40 |
| Water flooding | 1300 | 40 |
| $CO_2$ foam, surfactant generated | 1300 | 40 |
| Water flooding | 1300 | 40 |
| $CO_2$ foam, NP-surfactant generated | 1300 | 40 |
| Water flooding | 1300 | 40 |
| $CO_2$ foam, PEI (1 wt %, pH 8)-surfactant generated | 1300 | 40 |
| Water flooding | 1300 | 40 |
| Core #2 | | |
| Primary Drainage | Ambient | 40 |
| Water flooding | Ambient | 40 |
| Water flooding | 1300 | 40 |
| $CO_2$ foam, NP-surfactant generated | 1300 | 40 |
| Water flooding | 1300 | 40 |
| $CO_2$ foam, PEI (1 wt %, pH 8)-surfactant generated | 1300 | 40 |
| Water flooding | 1300 | 40 |
| $CO_2$ foam, surfactant generated | 1300 | 40 |
| Water flooding | 1300 | 40 |

TABLE 8-continued

List of core flood experiments and the order
in which they were conducted for each core.

| Test | Pressure (psi) | Temperature (Celsius) |
|---|---|---|
| Core #3 | | |
| Primary Drainage | Ambient | 40 |
| Water flooding | Ambient | 40 |
| Water flooding | 1300 | 40 |
| $CO_2$ foam, PEI (1 wt %, pH 8)-surfactant generated | 1300 | 40 |
| Water flooding | 1300 | 40 |
| $CO_2$ foam, NP-surfactant generated | 1300 | 40 |
| Water flooding | 1300 | 40 |
| $CO_2$ foam, surfactant generated | 1300 | 40 |
| Water flooding | 1300 | 40 |

The final core-flood experiments were conducted with Mississippian oil. Table 9 summarizes the initial oil saturations, residual oil saturations and the percentage of oil recovered after each test. The percentage of oil recovered was determined based on the oil in place after each test.

For Core #1, the PECNP Surfactant Solution-generated $CO_2$ foam recovered 9.1% of the oil that remained after the surfactant $CO_2$ foam flood. The PEI Surfactant Solution generated foam further recovered 2% of the oil that remained after the PECNP-surfactant foam. This showed that the PECNP Surfactant Solution and PEI Surfactant Solution $CO_2$ foam systems were able to recover more oil once the Surfactant Solution-generated $CO_2$ foam ceased to produce more oil. From Core #2 and #3, it was observed that the surfactant generated $CO_2$ foam recovered only insignificant amounts of 0.5% and 0.33% oil after the other two $CO_2$ foam systems produced oil.

Figure 16:
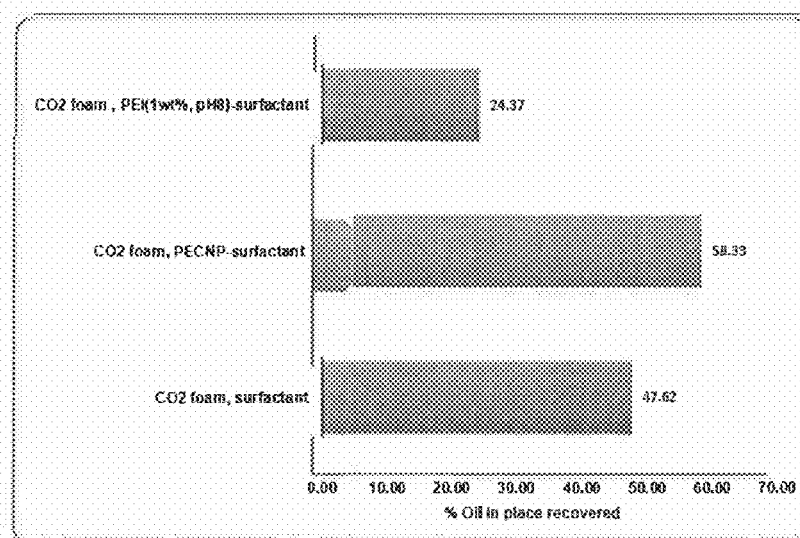
FIG. 16 is a bar graph comparing percentage recovery of oil in place corresponding to use of different foams.

FIG. 16 shows a comparison between the different cores among the first $CO_2$ foam tests conducted and the oil they produced. The PECNP Surfactant Solution-generated $CO_2$ foam in Core #2 recovered the most oil as compared to the other two cores. This foam system recovered 20% more oil after the waterflood as compared to 17% for the Surfactant Solution-generated $CO_2$ foam in Core #1. Core #3 recovered only 3% more oil after the water flood using the PEI Surfactant Solution foam. However in the same core (#3), the PECNP Surfactant Solution-generated foam recovered 6.38% of the remaining oil after the PEI Surfactant Solution foam test.

The permeability of Core #1 was the lowest compared to the other two cores. The PECNP Surfactant Solution $CO_2$ foam system that was injected in Core #2 recovered more oil despite the higher permeability. This further proves the stability of the PECNP Surfactant Solution $CO_2$ foam.

TABLE 9

List of the oil saturations and percentage of oil recovered
after different tests for the three different cores.

| Test | Oil Saturation values | % of oil in place recovered |
|---|---|---|
| Core #1 | | |
| After Primary drainage | 0.600 | — |
| After waterflood | 0.420 | 30.00% |
| After $CO_2$ foam, surfactant | 0.220 | 47.62% |
| After $CO_2$ foam, PECNP-surfactant | 0.200 | 9.10% |
| After $CO_2$ foam, PEI (1 wt %, pH 8)-surfactant | 0.196 | 2.00% |
| Core #2 | | |
| After Primary drainage | 0.460 | — |
| After waterflood | 0.285 | 38.52% |
| After $CO_2$ foam, PECNP-surfactant | 0.119 | 58.33% |
| After $CO_2$ foam, PEI (1 wt %, pH 8)-surfactant | 0.107 | 4.34% |
| After $CO_2$ foam, surfactant | 0.106 | 0.50% |
| Core #3 | | |
| After Primary drainage | 0.577 | — |
| Sor after waterflood | 0.455 | 21.11% |
| After $CO_2$ foam, PEI (1 wt %, pH 8)-surfactant | 0.344 | 24.37% |
| After $CO_2$ foam, PECNP-surfactant | 0.322 | 6.38% |
| After $CO_2$ foam, surfactant | 0.321 | 0.33% |

Example 5

Figure 17:
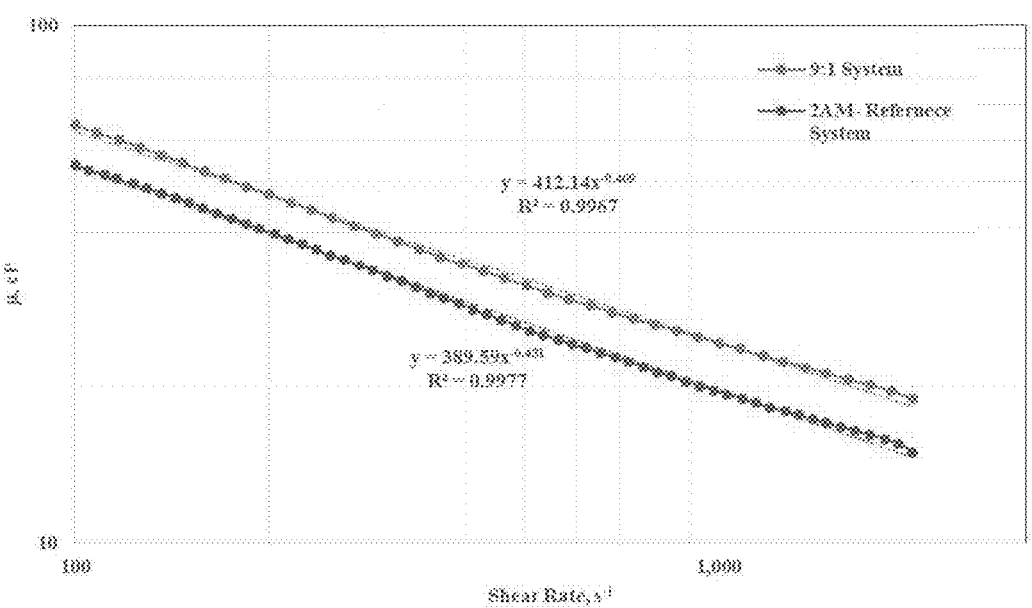
FIG. 17 is a graph showing improvement in foam rheology using polyelectrolyte complex nanoparticle system of 3:1:0.1 of PEI (1 wt % in 2% NaCl, pH=8.5):DS (1 wt % in 2% NaCl): 2% NaCl solution.

A PEI Solution was prepared by adding PEI to a brine solution (2% NaCl) to a final composition of 1% by weight PEI in 2% NaCl. The pH of this PEI solution was approximately 8.5. ADS Solution was prepared by adding DS to brine (2% NaCl), forming a 1 wt % DS solution. Finally, a nanoparticle (NP Solution) was prepared by mixing the PEI Solution and the DS Solution by volume in the ratio of 3:1:0.1 of PEI Solution (1 wt % in 2% NaCl):DS Solution (1 wt % in 2% NaCl):brine (2% NaCl). Significant improvement in the rheological properties of the $CO_2$ foam was obtained when the viscosity vs. shear rate curves were compared, as shown in FIG. 17.

Table 9, below, shows the K' and n' values for the non-Newtonian part of the shear sweep curve measured for baseline surfactant solution and compared to the nanoparticle system with 3:1:0.1 of PEI (1 wt % in 2% NaCl, pH=8.5):DS (1 wt % in 2% NaCl): 2% NaCl solution.

TABLE 9

| System | n' | K' | $R^2$ |
|---|---|---|---|
| 9:1 | 0.591 | 412.14 | 0.9967 |
| Only 2 AM | 0.569 | 389.59 | 0.9977 |

Example 6

Figure 18:
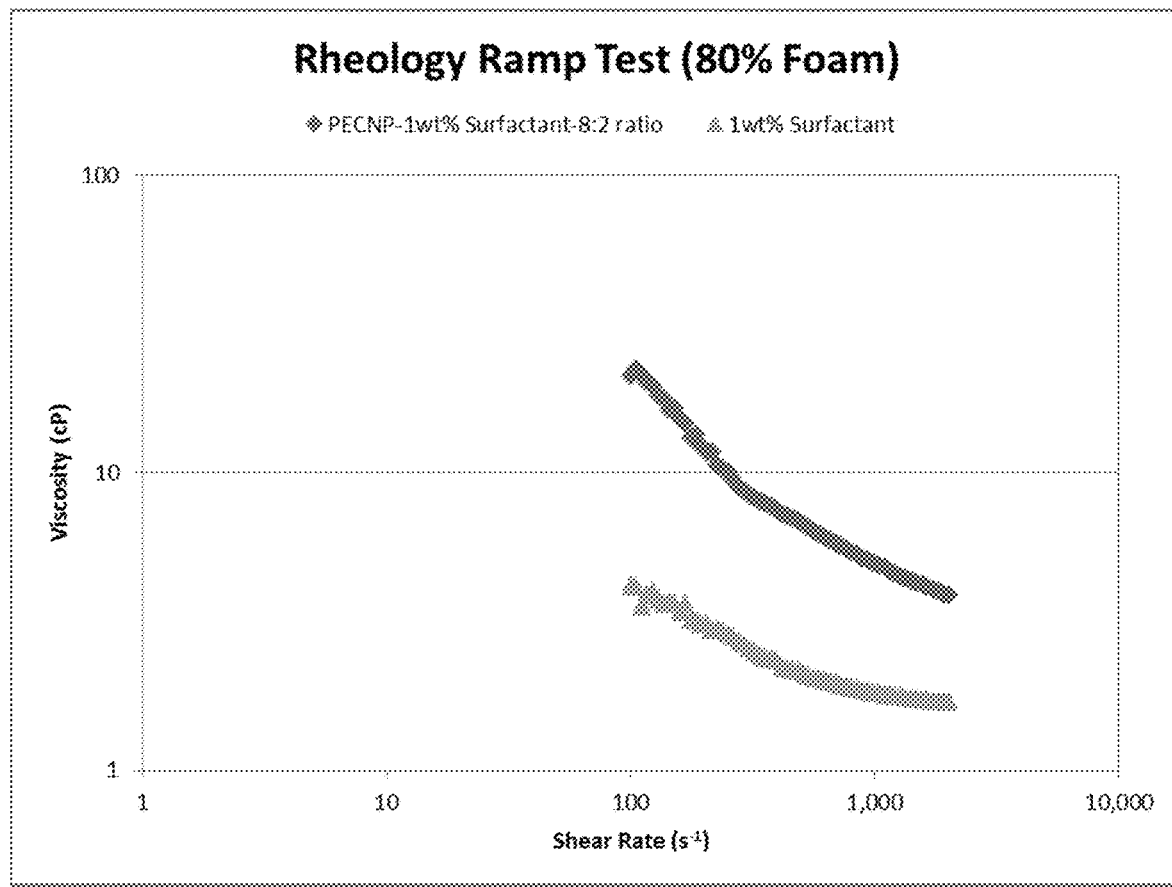
FIG. 18 is a graph comparing an 80% quality nitrogen foam system prepared in 2% NaCl with a baseline foam system prepared in 2% NaCl using a viscoelastic surfactant.

An 80% quality nitrogen foam system was prepared in 2% NaCl. A baseline foam system was prepared in 2% NaCl using a commercial viscoelastic surfactant, and its rheology was measured at a pH of 8.5. Foam viscosity was measured using an in-house foam rheometer at 1300 psi and 40° C. Improvements in foam stability due to electrostatic interactions with the surfactant micelles resulted in a significant increase in foam viscosity. FIG. 18 shows the improvement in $N_2$ foam rheology using the polyelectrolyte complex nanoparticle system of 3:1:0.1 of PEI (1 wt % in 2% NaCl, pH=8.5):DS (1 wt % in 2% NaCl): 2% NaCl solution. The improvement suggests the foam has increased proppant carrying capability during hydraulic fracturing.

REFERENCES

The foregoing discussion cites the following documents, which are incorporated by reference to the same extent as though fully replicated herein:

[1] D. Green and P. Willhite, Enhanced Oil Recovery, S P E, 1998.
[2] J. Christensen, E. Stenby and A. Skauge, "Review of WAG Field Experience," SPE, pp. 97-106, 2001.
[3] D. C. Bond and O. C. Holbrook, "Gas Drive Oil recovery process". U.S. Pat. No. 2,866,507, 30 Dec. 1958.
[4] D. X. Micha, B. Wei, Y. Sung, J. Eastoe, K. Trickett and A. Mohamed, "$CO_2$ soluble surfactants for Improved Mobility Control," in SPE Improved Oil recovery symposium 2010, Oklahoma, 2010.
[5] R. M. Enick and D. K. Olsen, "Mobility and Conformance Control for Carbon Dioxide Enhanced Oil Recovery ($CO_2$-EOR) via Thickeners, Foams, and Gels—A Detailed Literature Review of 40 Years of Research," U.S. Department of Energy, 2012.
[6] J. Yu, C. An, D. Mo, N. Liu and R. Lee, "Foam Mobility Control for Nanoparticle-Stabilized $CO_2$ Foam," in SPE Improved Oil recovery symposium, Oklahoma, 2012.
[7] J. Yu, N. Liu and R. Lee, "Generation of Nanoparticle-Stabilized Supercritical $CO_2$ Foams," in Carbon Management Technology Conference, Orlando, 2012.
[8] P. Nguyen, H. Fadaei and D. Sinton, "Nanoparticle Stabilized $CO_2$ in water foam for Mobility Control in Enhanced Oil Recovery via Microfluidic Method," in SPE Heavy oil conference-Canada, Toronto, 2014.
[9] D. E. Alejandro, F. M. Caldelas, K. P. Johnston, S. L. Bryant and C. Huh, "Nanoparticle-Stabilized Supercritical $CO_2$ Foams for Potential Mobility Control Applications," in SPE Improved Oil Recovery Symposium, Tulsa, 2010.
[10] J. Koetz and S. Kosmella, Polyelectrolytes and Nanoparticles, Springer Laboratory Manuals in Polymer Science, 2006.
[11] J. Koetz, S. Kosmella and T. Beitz, "Self assembled polyelectrolyte systems," Elseiver, Progress in Polymer Science, pp. 1199-1232, 2001.
[12] N. Kristen and R. v. Klitzing, "Effect of polyelectrolyte/surfactant combination on the stability of foam films," 2010.
[13] D. Taylor, R. Thomas and J. Penfold, "Polymer/surfactant interactions at the air/water interface," Advances in Colloid and Interface Science 132 (2007) 69-110, pp. 70-110, 2007.
[14] K. He, Z. Yue, C. Fan and L. Xu, "Minimizing Surfactant Adsorption Using Polyelectrolyte Based Sacrificial Agent: a Way to Optimize Surfactant Performance in Unconventional Formations," in SPE International Symposium on Oilfield Chemistry, Woodlands, 2015.
[15] R. Barati, S. Johnson, S. Mc Cool, D. Green and J. Liang, "Polyelectrolyte complex nanoparticles for protection and delayed release of enzymes in alkaline pH and at elevated temperature during hydraulic fracturing of oil wells," Journal of Applied Polymer Science, pp. 587-592, 2012.
[16] R. Barati, S. Johnson, S. McCool, D. Green, G. Willhite and J. Liang, "Fracturing fluid cleanup by controlled release of enzymes from polyelectrolyte complex nanoparticles," Applied Polymer Science, vol. 121, no. 3, pp. 1292-1298, 5 Aug. 2011.
[17] S. Johnson, J. Trejo, M. W. P. G. Veisi, J.-T. Liang and C. Berkland, "Effects of divalent cations, seawater, and formation brine on positively charged polyethylenimine/dextran sulfate/chromium(III) polyelectrolyte complexes and partially hydrolyzed polyacrylamide/chromium(III) gelation," Journal of Applied Polymer Science, vol. 115, no. 2, pp. 1008-1014, 2010.
[18] D. S. Schechter and R. B. Grigg, "Improved efficiency of miscible $CO_2$ floods and Enhanced prospects for $CO_2$ flooding heterogenous reservoirs," U.S. Department of Energy, Socorro, 1998.
[19] R. Petkova, S. Tcholakova and N. Denkov, "Foaming and foam stability for mixed polymer-surfactant solutions: effects of surfactant type and polymer charge," Langmuir, ACS Publications, pp. 4996-5009, 2012.
[20] T. J. Waree, R. C. Sims and R. Middaugh, "Insulin Containing Polyethylenimine-Dextran Sulfate Nanoparticles." International Journal of Pharmaceutics, pp. 139-151, 2003.
[21] C. B. Chempakathinal, B. Alshatti, L. Swartz, A. Gupta and R. Barati, "Dual Application of Polyelectrolyte Complex Nanoparticles as Enzyme Breaker Carriers and Fluid Loss Additives for Fracturing Fluids," in SPE/CSUR Unconventional Resources Conference—Canada, 30 September-2 October, Calgary, 2014.
[22] S. J. Johnson, R. Barati, S. Mc Cool, D. W. Green, G. P. Willhite and J.-T. Liang, "Polyelectrolyte complex nanoparticles to entrap enzymes for hydraulic fracturing fluid cleanup," in ABSTRACTS OF PAPERS OF THE AMERICAN CHEMICAL SOCIETY, 2011.
[23] Ouyang, "New Correlations for Predicting the Density and Viscosity of Supercritical Carbon Dioxide Under Conditions Expected in Carbon Capture and Sequestration Operations," The Open Petroleum Engineering Journal (2011).
[24] Ghahfarokhi, R. B., Pennell, S., Matson, M., & Linroth, M. (2016 Apr. 11). Overview of $CO_2$ Injection and WAG Sensitivity in SACROC. Society of Petroleum Engineers. doi: 10.2118/179569-MS

The invention claimed is:

1. A foam comprising:
 a non-liquid fluid phase comprising $N_2$ in a supercritical phase; and
 a liquid dispersion phase comprising a dispersion of polyelectrolyte material and surfactant in water, wherein:
  the polyelectrolyte material and the surfactant are combined in a ratio of surfactant to polyelectrolyte material ranging from 3:1 to 9:1;
  the polyelectrolyte material is present in an amount ranging from about 0.01% to 5% of the liquid phase by weight; and
  the polyelectrolyte material forms nanoparticles by electrostatic interaction of a cationic and an anionic polyelectrolyte, the nanoparticles being located at lamellae of the liquid dispersion phase in an effective amount to stabilize the foam.

2. The foam of claim 1, further comprising a pH adjusting agent in an effective amount to reduce pH of the foam to a value ranging from 5 to 9.

3. The foam of claim 1, wherein the foam has a foam quality ranging from 60% to 90% of the non-liquid fluid phase by volume.

4. The foam of claim 3, wherein the foam quality ranges from 80% to 90% of the non-liquid fluid phase by volume.

5. The foam of claim 3, wherein the foam quality is assessed at conditions of pressure and temperature in a petroleum reservoir.

6. The foam of claim 1, wherein the surfactant is a nonionic surfactant selected from the group consisting of:

cetyl alcohol, stearyl alcohol, cetostearyl alcohol and oleyl alcohol, polyoxyethylene glycol alkyl ethers, octaethylene glycol monododecyl ether, pentaethylene glycol monododecyl ether, polyoxypropylene glycol alkyl ethers, glucoside alkyl ether, decyl glucoside, lauryl glucoside, octyl glucoside, polyoxyethylene glycol octylphenol ethers, polyoxyethylene glycol alkylphenol ethers, glycerol alkyl esters, glyceryl laurate, polyoxyethylene glycol sorbitan alkyl esters, sorbitan alkyl esters, dodecyldimethylamine oxide, block copolymers of polyethylene glycol and polypropylene glycol, and polyethoxylated tallow amine.

7. The foam of claim 1, wherein the surfactant is an anionic surfactant selected from the group consisting of: ammonium lauryl sulfate, sodium lauryl sulfate, sodium dodecyl sulfate, sodium laureth sulfate, sodium lauryl ether sulfate, sodium myreth sulfate, dioctyl sodium sulfosuccinate, perfluorooctanesulfonate, perfluorobutanesulfonate, an alkyl-aryl ether phosphate, and an alkyl ether phosphate.

8. The foam of claim 1 wherein the cationic polyelectrolyte is selected from the group consisting of polyethyleneimine, polyallylamine, chitosan, and combinations thereof.

9. The foam of claim 1 wherein the anionic polyelectrolyte comprises dextran sulfate.

10. The foam of claim 9 wherein the cationic polyelectrolyte is selected from the group consisting of polyethyleneimine, polyallylamine, chitosan, and combinations thereof.

11. A method of foam flooding, comprising the steps of:
introducing a foam into an injection wellbore, the foam comprising:
a non-liquid fluid phase comprising $N_2$ in a supercritical phase; and
a liquid dispersion phase comprising a dispersion of polyelectrolyte material and surfactant in water, wherein:
the polyelectrolyte material and the surfactant are combined in a ratio of surfactant to polyelectrolyte material such that a concentration of the surfactant is below a critical micelle concentration;
the polyelectrolyte material is present in an amount ranging from about 0.01% to 5% of the liquid phase by weight; and
the polyelectrolyte material forms nanoparticles by electrostatic interaction of a cationic and an anionic polyelectrolyte, the nanoparticles being located at lamellae of the liquid dispersion phase in an effective amount to stabilize the foam; and
wherein the foam has a foam quality ranging from 60% to 90% of the total foam volume occupied by the non-liquid fluid phase;
flowing the foam through the injection wellbore for subsequent introduction into rock of an oil reservoir;
flooding the foam from the injection wellbore on a pathway extending from the injection wellbore through the oil reservoir and towards one or more producing wellbores to enhance recovery of oil in place from the oil reservoir.

12. The method of claim 11, further comprising a step of forming the foam, wherein the foam is formed via inline injection to combine the gas phase with the liquid dispersion phase.

13. A foam, comprising:
a non-liquid fluid in a supercritical phase; and
a liquid dispersion phase comprising a dispersion of polyelectrolyte material and surfactant in water, wherein:
the polyelectrolyte material and the surfactant are combined in a ratio of surfactant to polyelectrolyte material such that a concentration of the surfactant is below a critical micelle concentration;
the polyelectrolyte material is present in an amount ranging from about 0.01% to 5% of the liquid phase by weight; and
the polyelectrolyte material forms nanoparticles by electrostatic interaction of a cationic and an anionic polyelectrolyte, the nanoparticles being located at lamellae of the liquid dispersion phase in an effective amount to stabilize the foam;
wherein the foam has a foam quality ranging from 60% to 90% determined as a percentage total foam volume occupied by the gas phase.

14. The foam of claim 13, wherein the polyelectrolyte material and the surfactant are combined in a ratio of surfactant to polyelectrolyte material ranging from 3:1 to 9:1.

15. The foam of claim 14, wherein the non-liquid fluid is $N_2$.

16. The foam of claim 14, wherein the non-liquid fluid is $CO_2$.

17. The foam of claim 13, wherein the non-liquid fluid is $N_2$.

18. The foam of claim 13, wherein the surfactant is selected from a group consisting of anionic surfactants, nonionic surfactants and combinations thereof in an amount that is optimized by selection according to zeta potential.

19. The foam of claim 18, wherein the polyelectrolyte material comprises at least one of polyethyleneimine, polyallylamine, chitosan and dextran sulfate.

20. The foam of claim 13, further comprising a pH adjusting agent in an effective amount to adjust pH of the foam to a value ranging from 5 to 9.

* * * * *